(12) United States Patent
Park et al.

(10) Patent No.: US 12,494,471 B2
(45) Date of Patent: Dec. 9, 2025

(54) MECHANICAL STRIPPING OF SACRIFICIAL LAYER

(71) Applicant: Enovix Corporation, Fremont, CA (US)

(72) Inventors: Ki Tae Park, Santa Clara, CA (US); Chaojun Shi, Palo Alto, CA (US); Yoshifumi Shimizu, Cupertino, CA (US); Kim Lester Fortunati, Pleasanton, CA (US); Ashim Shatil Hague, Fremont, CA (US)

(73) Assignee: Enovix Corporation, Fremont, CA (US)

( * ) Notice: Subject to any disclaimer, the term of this patent is extended or adjusted under 35 U.S.C. 154(b) by 0 days.

(21) Appl. No.: 18/534,499

(22) Filed: Dec. 8, 2023

(65) Prior Publication Data

US 2025/0192132 A1  Jun. 12, 2025

(51) Int. Cl.
*H01M 4/04* (2006.01)
(52) U.S. Cl.
CPC ....... *H01M 4/0404* (2013.01); *H01M 4/0435* (2013.01); *H01M 4/0471* (2013.01)
(58) Field of Classification Search
CPC ............ B05C 9/06; B05C 5/027; H01M 4/13; H01M 4/0402; H01M 4/0404; H01M 4/043; H01M 10/058; H01M 4/139; H01M 4/0435; H01M 4/035; H01M 4/134
See application file for complete search history.

(56) References Cited

U.S. PATENT DOCUMENTS

| | | |
|---|---|---|
| 2012/0045689 A1 | 2/2012 | Okabe et al. |
| 2013/0326865 A1 | 12/2013 | Kobayashi et al. |
| 2014/0308434 A1 | 10/2014 | Morishima et al. |
| 2015/0017523 A1 | 1/2015 | Hirai et al. |

(Continued)

FOREIGN PATENT DOCUMENTS

| | | | |
|---|---|---|---|
| CN | 113707839 | * | 11/2021 |
| CN | 113707839 A | | 11/2021 |

(Continued)

OTHER PUBLICATIONS

Research Insttute Overview, R&D and Smart Manufacturing, https://www.atlbattery.com/en/research.html (Jan. 24, 2025), 7 pages.

(Continued)

*Primary Examiner* — Tabassom Tadayyon Eslami
(74) *Attorney, Agent, or Firm* — Ronit Buller

(57) ABSTRACT

Systems and methods are provided herein for removing alternate material from a foil while minimizing the amount of alternate material particles that are deposited on the surface of an active material. For example, a web may comprise an active material on a first portion of a foil and an alternate material on a second portion of the foil. One or more brushes may be used to remove the alternate material from the second portion of the foil. As the one or more brushes remove the alternate material from the second portion of the foil, a vacuum may be used to capture the alternate material that is removed from the second portion of the foil. In such an example, the resulting web no longer has alternate material on the second portion of the foil and has reduced alternate material particles on the surface of the active material.

20 Claims, 20 Drawing Sheets

(56) References Cited

U.S. PATENT DOCUMENTS

| | | |
|---|---|---|
| 2020/0161711 A1 | 5/2020 | Hayashi et al. |
| 2020/0203712 A1 | 6/2020 | Park et al. |
| 2022/0140303 A1 | 5/2022 | Lee et al. |
| 2022/0263064 A1* | 8/2022 | Nakashima ......... H01M 10/058 |
| 2022/0384772 A1 | 12/2022 | Zhang et al. |
| 2023/0317913 A1 | 10/2023 | Park et al. |
| 2024/0162432 A1 | 5/2024 | Nishiyama et al. |
| 2024/0384931 A1 | 11/2024 | Moon et al. |
| 2025/0096225 A1 | 3/2025 | Ellison et al. |
| 2025/0140781 A1 | 5/2025 | Manda |
| 2025/0192133 A1 | 6/2025 | Park et al. |

FOREIGN PATENT DOCUMENTS

| | | | |
|---|---|---|---|
| CN | 221353058 U | | 7/2024 |
| DE | 102019216077 | * | 4/2020 |

OTHER PUBLICATIONS

U.S. Appl. No. 18/534,503—Non-Final Office Action mailed on Oct. 9, 2025, 9 Pages.

\* cited by examiner

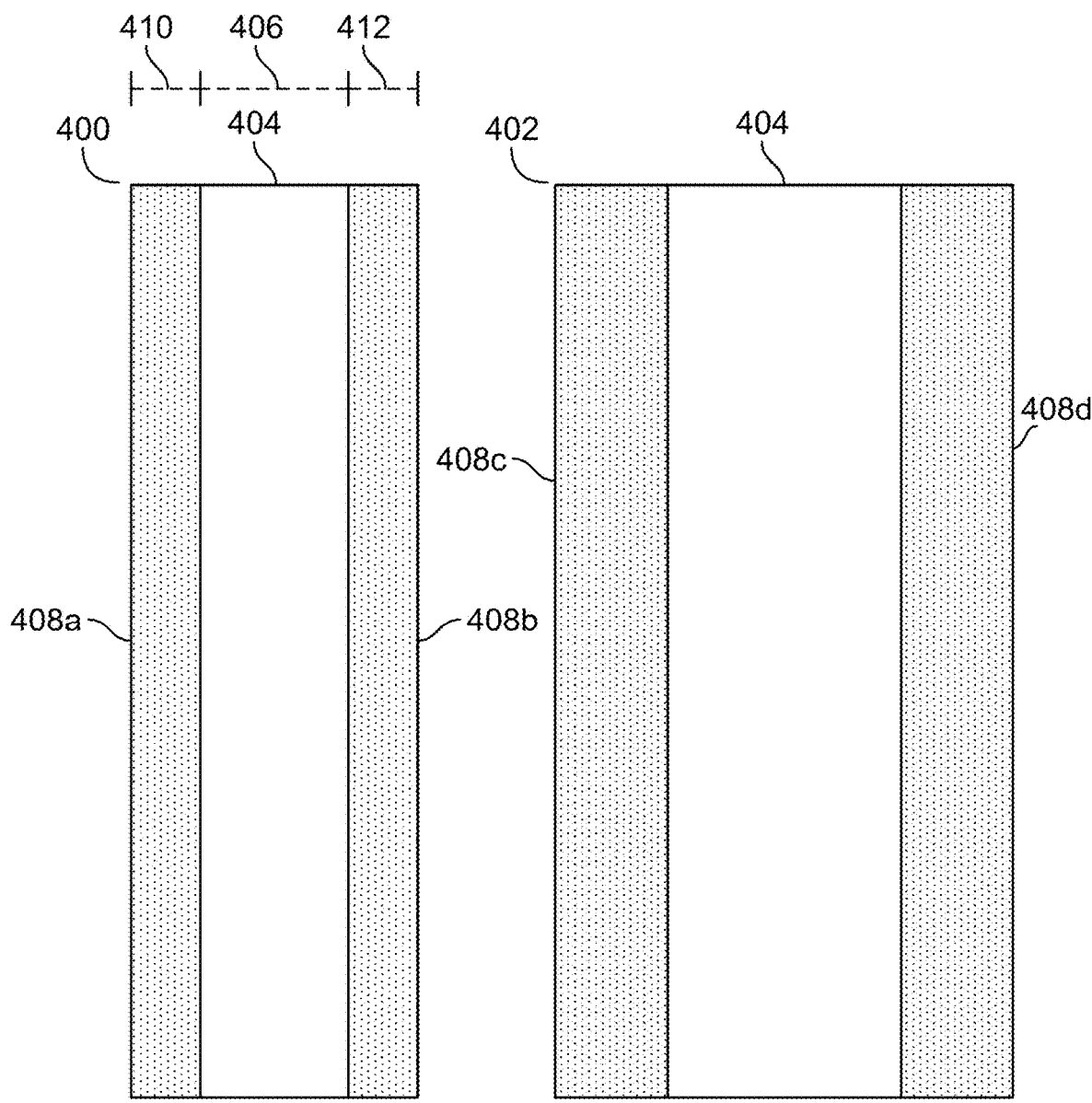

2200

2202 Coat a first portion of a foil with an active material having a first thickness

2204 Coat a second portion of the foil with an alternate material having a second thickness

2206 Coat a third portion of the foil with the alternate material having the second thickness, wherein the first portion of the foil is between the second portion of the foil and the third portion of the foil

2208 Dry the foil comprising the active material on the first portion of the foil and the alternate material on the second and third portions of the foil

2210 Generate a web by calendering the foil comprising the active material on the first portion of the foil and the alternate material on the second and third portions of the foil, wherein the alternate material reduces wrinkling in the second and third portion of the foil

2212 Slit the web into one or more electrodes

2402 Coat a first portion of a foil with an active material having a first thickness

2404 Coat a second portion of the foil with an alternate material having a second thickness

2406 Dry the foil comprising the active material on the first portion of the foil and the alternate material on the second portion of the foil

2408 Generate a web by calendering the foil comprising the active material on the first portion of the foil and the alternate material on the second portion of the foil

2410 Remove the alternate material from the second portion of the foil using a first brush and a first vacuum

2412 Slit the web into one or more electrodes

FIG. 24

MECHANICAL STRIPPING OF SACRIFICIAL LAYER

BACKGROUND

The present disclosure relates to methods and structures such as electrode assemblies for use in energy storage devices such as secondary batteries, to energy storage devices employing such structures, and to methods for manufacturing such structures and energy devices.

SUMMARY

Manufacturing of energy storage devices often includes calendering electrode coatings in order to compact the coatings to a target density and improve the energy density of the resulting energy storage device. Proper calendering is particularly important as the process can affect the porosity, adhesion, thickness, wettability, and charge transport properties of the electrodes, as well as the homogeneity of the coatings. Problems can arise when calendering objects with non-uniform thickness. For example, an active material (e.g., cathode material, anode material) may be coated on a portion of a piece of foil (e.g., aluminum, copper, stainless steel, nickel, and/or similar such materials) during the manufacturing process. Subsequent calendering may result in higher pressures being applied to the coated areas in comparison to the non-coated areas. The pressure difference can result in the stretching of the coated areas while the non-coated areas are not stretched. The difference in stretching between the coated areas and the non-coated areas can create wrinkles. These wrinkles may hinder subsequent manufacturing steps and can result in reduced performance in the resulting energy storage device.

Similarly, calendering objects with non-uniform compressibility may also lead to wrinkling. For example, a first material may be coated on a portion of a foil and a second material may be coated on a different portion of the foil. The first and second materials may have similar thicknesses, but may have different compressibilities (e.g., the second material may be more easily compressed than the first material). This difference in compressibility between the first material and the second material can result in the portion of the foil coated with the first material being stretched a first amount and the portion of the foil coated with the second material being stretched a second amount when calendered under identical conditions. The difference in stretching between the portion of the foil coated with the first material and the portion of the foil coated with the second material can create wrinkles. One solution to these problems has been to coat the entire foil with the active material to ensure uniform pressure during the calendering process. This solution does reduce the wrinkles but is often not cost effective because the active material is expensive.

Accordingly, techniques are disclosed herein for a system to apply sacrificial material to the otherwise uncoated areas of the foil to provide uniform pressure during calendering. For example, one or more portions of a foil may be coated with an active material (e.g., cathode material, anode material) while other portions of the foil may be coated with an appropriately selected alternate material (e.g., different active materials, inactive materials, functional materials, inexpensive materials). The materials may be coated onto the foil using a slot die. The active and alternate materials may or may not have similar thicknesses and compressibility, but the alternate material should be selected so that compression of both materials with identical forces provides similar stretching to the foil under both materials. In some implementations, the alternate material comprises polymer binder materials, carbon materials, color pigments, and/or ceramic materials, and may be coated onto the foil using a slot die or spray coating.

After the active material and the alternate material are applied to the foil, the foil may be dried and then calendered. During calendering, a pair of opposing rollers may apply a compressive force to the foil. The compressive force of the rollers can cause the portion of the foil coated in the active material to stretch a similar amount to the portions of the foil coated in the alternate material. The resulting calendered web has minimal wrinkles due to the similarity of the stretching of the foil coated in the active material and the foil coated in the alternate material. Accordingly, applying the alternate material to the portions of the foil not coated in the active material results in more even pressure during calendering and less wrinkling.

In some implementations, the alternate material is removed after the calendering process. The alternate material may be removed using laser ablation. However, laser ablation may result in a fume containing charred or vaporized particles of the alternate material, and some of the alternate material particles may deposit on the surface of the active material. Alternate material particles on the surface of the active material may decrease the efficiency of the resulting electrode. There exists a need for a process that removes the alternate material from the foil while minimizing the amount of alternate material that ends up on the surface of the active material.

Accordingly, techniques are disclosed for removing alternate material from a foil while minimizing the amount of alternate material particles that are deposited on the surface of an active material. For example, a web may comprise an active material on a first portion of a foil and an alternate material on a second portion of the foil. One or more brushes may be used to remove the alternate material from the second portion of the foil. As the one or more brushes remove the alternate material from the second portion of the foil, a vacuum may be used to capture the alternate material that is removed from the second portion of the foil. In another example, laser ablation may be used to remove the alternate material from the second portion of the foil. As laser ablation removes the alternate material from the second portion of the foil, a vacuum may be used to capture the alternate material that is removed from the second portion of the foil. In another example, dry etching may be used to remove the alternate material from the second portion of the foil. As the alternate material is removed from the second portion of the foil using dry etching, a vacuum may be used to capture the alternate material that is removed from the second portion of the foil. In all of these examples, the resulting web no longer has alternate material on the second portion of the foil and has reduced alternate material particles on the surface of the active material.

BRIEF DESCRIPTION OF THE DRAWINGS

The present disclosure, in accordance with one or more various implementations, is described in detail with reference to the following drawings. The drawings are provided for purposes of illustration only and merely depict typical or example implementations. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 7 shows a plan view of foil coated with active material and alternate material before a calendering process, in accordance with some implementations of the disclosure.

FIG. 8 shows a plan view of foil coated with active material and alternate material after a calendering process, in accordance with some implementations of the disclosure.

FIG. 22 is another illustrative flowchart of a process for applying alternate material to a foil to provide uniform pressure during calendering, in accordance with some implementations of the disclosure.

FIG. 24 is another illustrative flowchart of a process for removing alternate material from a foil, in accordance with some implementations of the disclosure.

DETAILED DESCRIPTION

Figure 1:
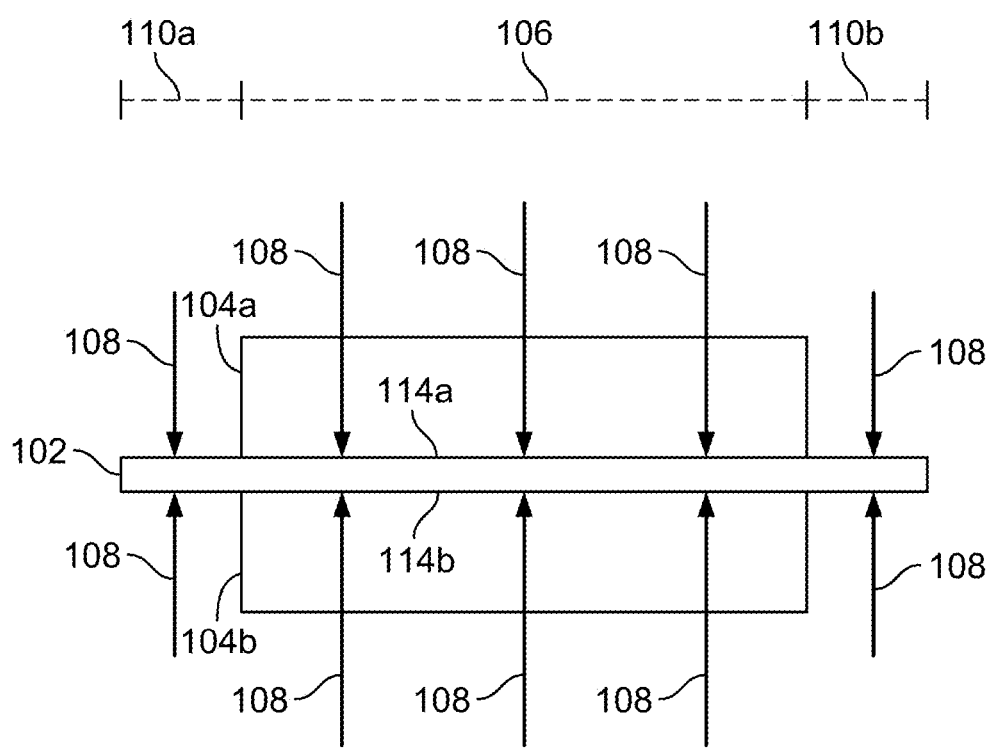
FIG. 1 is a cross section of a foil coated with active material, in accordance with some implementations of the disclosure.

FIG. 1 is a cross sectional view of a foil 102 coated with active material. For example, a first active material 104a is coated onto a first portion 106 of a first surface 114a of the foil 102. The active material may be any anodically active or cathodically active material. "Anode material" or "anodically active material" may refer to materials suitable for use as a negative electrode of a secondary battery during discharge of the secondary battery. "Cathode material" or "cathodically active material" may refer to material suitable for use as a positive electrode of a secondary battery during discharge of the secondary battery.

In some implementations, the cathodically active material may be selected from transition metal oxides, transition metal sulfides, transition metal nitrides, lithium-transition metal oxides, lithium-transition metal sulfides, transition-metal phosphates, lithium-transition-metal phosphates, and lithium-transition metal nitrides may be selectively used. The transition metal elements of these transition metal oxides, transition metal sulfides, and transition metal nitrides can include metal elements having a d-shell or f-shell. Specific examples of such metal elements are Sc, Y, lanthanides, actinides, Ti, Zr, Hf, V, Nb, Ta, Cr, Mo, W, Mn, Tc, Re, Fe, Ru, Os, Co, Rh, Ir, Ni, Pb, Pt, Cu, Ag, and Au. Additional cathode active materials include LiCoO2, LiNi0.5Mn1.5O4, Li(NixCoyAlz)O2, LiFePO4, Li2MnO4, V2O5, molybdenum oxysulfides, phosphates, silicates, vanadates, sulfur, sulfur compounds, oxygen (air), Li(NixMnyCoz)O2, and combinations thereof.

Exemplary anodically active materials include carbon materials such as graphite and soft or hard carbons, or graphene (e.g., single-walled or multi-walled carbon nanotubes), or any of a range of metals, semi-metals, alloys, oxides, nitrides and compounds capable of intercalating lithium or forming an alloy with lithium. Specific examples of the metals or semi-metals that may be used as the anode material include graphite, tin, lead, magnesium, aluminum, boron, gallium, silicon, Si/C composites, Si/graphite blends, silicon oxide (SiOx), porous Si, intermetallic Si alloys, indium, zirconium, germanium, bismuth, cadmium, antimony, silver, zinc, arsenic, hafnium, yttrium, lithium, sodium, graphite, carbon, lithium titanate, palladium, and mixtures thereof. In some implementations, the anodically active material comprises aluminum, tin, or silicon, or an oxide thereof, a nitride thereof, a fluoride thereof, or other alloy thereof. In some implementations, the anodically active material comprises silicon or an alloy or oxide thereof.

In some implementations, the first active material 104a is coated onto the first portion 106 of the first surface 114a of the foil 102. For example, the first active material 104a may be coated onto the first portion 106 of the first surface 114a of the foil 102 using a slot die. In some implementations, a second active material 104b is coated onto the first portion 106 of a second surface 104b of the foil 102. For example, the second active material 104b may be coated onto the first portion 106 of the second surface 114b of the foil 102 using a second slot die. In some implementations, the first active material 104a and the second active material 104b correspond to a cathode material. In some implementations, the first active material 104a and the second active material 104b correspond to an anode material.

After the first active material 104a and the second active material 104b are coated onto the foil 102, the foil 102 may undergo a calendering process. For example, a pair of opposing rollers may apply a compressive force 108 to the foil 102. The compressive force 108 may result in a larger force being applied to the first portion 106 of the foil 102 because the first portion 106 of the foil 102 is coated in the first active material 104a and the second active material 104b and a smaller force being applied to other portions (other portion 110a and other portion 110b) of the foil 102 because the other portions of the foil 102 is not coated with the first active material 104a and the second active material 104b.

Figure 2:
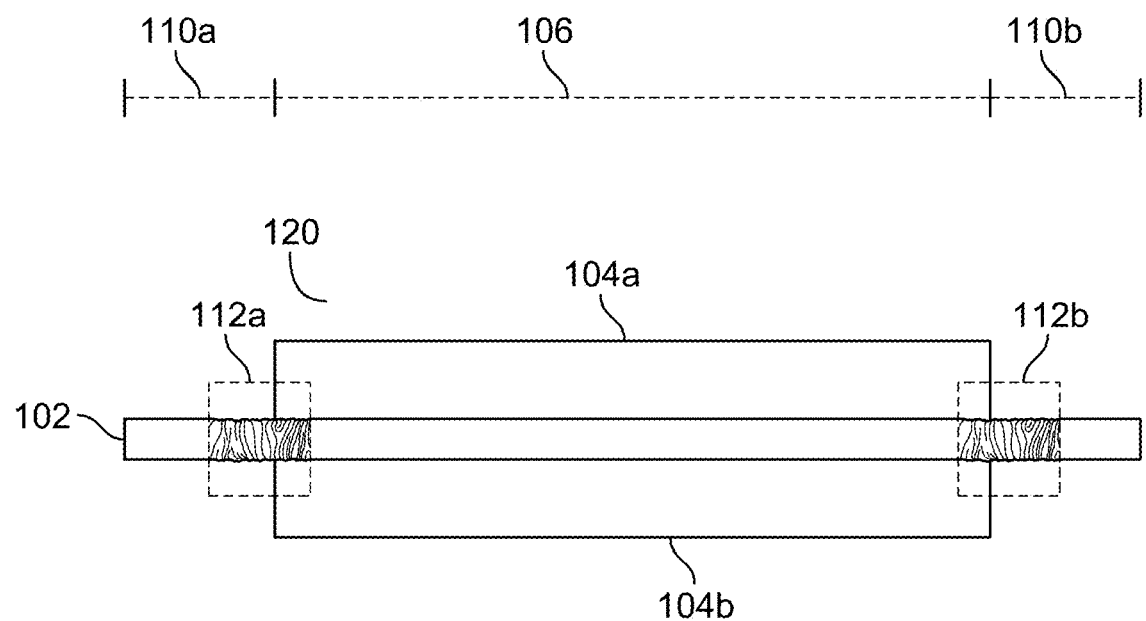
FIG. 2 is a cross section of calendered web material, in accordance with some implementations of the disclosure.

FIG. 2 displays a calendered web 120. The calendered web 120 comprises a first wrinkle 112a and a second wrinkle 112b in the foil 102. In some implementations, the first wrinkle 112a and/or the second wrinkle 112b are caused, at least in part, due to different forces being applied to the different portions of the foil 102. In some implementations, the first wrinkle 112a and/or the second wrinkle 112b hinder subsequent manufacturing steps and/or result in reduced performance in an energy storage device using the calendered web 120.

Figure 3:
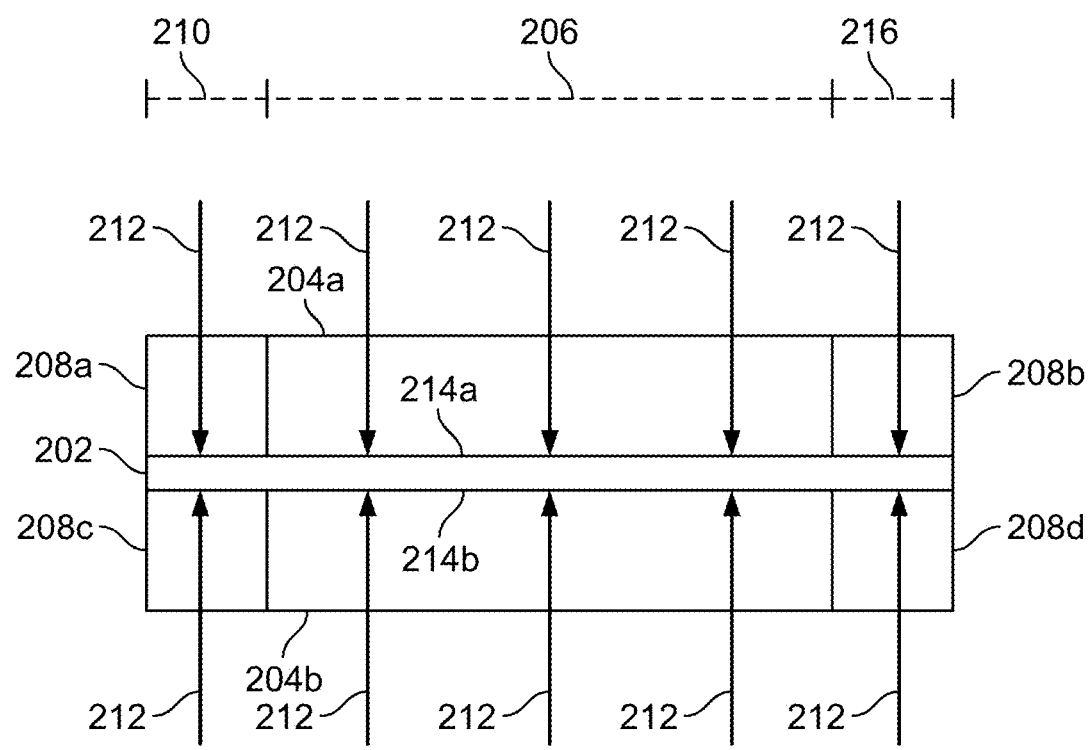
FIG. 3 is a cross section of a foil coated with active material and alternate material, in accordance with some implementations of the disclosure.

FIG. 3 is a cross sectional view of a foil 202 coated with active material and alternate material. In some implementations, the first active material 204a is coated onto a first portion 206 of a first surface 214a of the foil 202. For example, the first active material 204a may be coated onto the first portion 206 of the first surface 214a of the foil 202 using a slot die. Although FIG. 3 only displays the first active material 204a coated on the first portion 206 of the first surface 214a of the foil 202, the first active material 204a may be coated onto multiple portions of the first surface 214a of the foil 202. In some implementations, a first alternate material 208a is coated onto a second portion 210 of the first surface 214a of the foil 202. For example, the first alternate material 208a may be coated onto the first surface 214a of the foil 202 using a slot die or spray coating. In some implementations, a second alternate material 208b is coated onto a third portion 216 of the first surface 214a of the foil 202. In some implementations, a second alternate material 208b is coated onto the foil using the same or a similar methodology (e.g., slot die, spray coating, etc.) as the first alternate material 208a. Although FIG. 3 displays the first alternate material 208a coated on the second portion 210 of the first surface 214a of the foil 202 and a second alternate material 208b coated on a third portion 216 of the first surface 214a of the foil 202, alternate material may be coated on fewer portions or more portions of the first surface 214a of the foil 202 than shown.

In some implementations, the active material (e.g., first active material 204a) and/or the alternate material (e.g., first alternate material 208a, second alternate material 208b, etc.) is a slurry when coated onto the foil 202. For example, the alternate material may have a viscosity between 200 and 8,000 centipoise (CPS) and a solids content between 15% and 85%. In some implementations, the active material has a different viscosity and/or solids content depending on the type of material. For example, if the active material corresponds to a cathode material, then the viscosity may be between 1,000 and 15,000 CPS and the solids content between 40% and 85%. In another example, if the active material corresponds to an anode material, then the viscosity may be between 200 and 5,000 CPS and the solids content may be between 15% and 60%.

In some implementations, the alternate material (e.g., first alternate material 208a, second alternate material 208b, etc.) may be different active materials, inactive materials, functional materials, inexpensive materials, and/or similar such materials. In some implementations, the alternate material may comprise polymer binder materials, carbon materials, color pigments, ceramic materials, and/or similar such materials. In some implementations, the alternate material comprises between 0% and 50% polymer binder materials. In some implementations, the alternate material comprises between 0% and 70% carbon materials. In some implementations, the alternate material comprises between 0% and 10% color pigment materials. In some implementations, the alternate material comprises between 0% and 90% ceramic materials. In some implementations, the polymer binder materials may include carboxymethyl cellulose (CMC), polytetrafluoroethylene (PTFE), polyvinylidene fluoride (PVdF), agar-agar-alginate, amylose, arabic gum, carrageenan, caseine, chitosan, cyclodextrins, ethylene propylene diene monomer (EPDM), gelatine, gellan gum, guar gum, karaya gum, cellulose, pectine, polyethylenedioxythiophene/polystyrene sulfonate (PEDOT: PSS), polyacrylic acid (PAA), polymer modified asphalt (PMA), polyvinyl alcohol (PVA), polyvinyl acetate (PVAC), polyacrylonitrile (PAN), polyaniline (PANI), polyethylene (PE), polyimide (PI), polyamide-imide (PAI), polystyrene (PS), polyurethane (PU), polyvinyl butyral (PVB), polyvinylpyrrolidone (PVP), starch, styrene-butadiene rubber (SBR), TaraGum, TRD202A, and/or similar such materials. In some implementations, the ceramic materials comprise alumina, boehmite, zirconia, boron nitride, and/or similar such materials. In some implementations, graphite, hard carbon, silicon oxide and/or anode-related materials are not used for the alternate material.

In some implementations, the alternate material (e.g., first alternate material 208a, second alternate material 208b, etc.) is formed using one or more solvents. For example, the alternate material may be formed using non-polar organic solvents (e.g., alkane, xylene, benzene, toluene, acetic acid, chloroform, diethyl ether, ethyl acetate, and/or similar such materials). In another example, the alternate material may be formed using polar solvents (e.g., dimethylformamide (DMF), dimethyl sulfoxide (DMSO), water, acetone, methanol, isopropanol, acetonitrile, n-methyl-2-pyrrolidone (NMP), and/or similar such materials).

In some implementations, the active material (e.g., first active material 204a) corresponds to cathode materials with higher mass loading. For example, the active material may correspond to a lithium cobalt oxide (LCO) electrode with an electrode mass loading between 20 mg/cm$^2$ and 40 mg/cm$^2$ for a single side. In another example, the active material may correspond to a nickel cobalt manganese (NCM) electrode with an electrode mass loading between 20 mg/cm$^2$ and 35 mg/cm$^2$ for a single side. In another example, the active material may correspond to a lithium iron phosphate (LFP) electrode with an electrode mass loading between 15 mg/cm$^2$ and 30 mg/cm$^2$ for a single side.

In some implementations, the alternate material (e.g., first alternate material 208a, second alternate material 208b, etc.) is combined with inorganic materials (e.g., ceramic materials, carbon materials, and/or similar such materials) and a binder. In some implementations, the carbon materials include activated carbon, ketjen carbon, carbon black, acetylene black, and/or similar such materials. In some implementations, the alternate material comprises materials with a specific surface area (SSA) that is larger than 100 m²/g. For example, the alternate material may comprise $Al_2O_3$ and have an SSA between 100 m²/g and 500 m²/g. In another example, the alternate material may comprise carbon and have an SSA between 150 m²/g and 3500 m²/g. In another example, the alternate material may comprise one or more ceramic materials and have an SSA between 200 m²/g and 2000 m²/g. In some implementations, the alternate material comprises materials with an SSA that is more than 100 times larger than the SSA of the active material to facilitate removal of the alternate material. For example, the active material may correspond to an LCO electrode and may have an SSA between 0.07 m²/g and 0.3 m²/g, and the alternate material may comprise carbon and have an SSA between 150 m²/g and 3500 m²/g. In another example, the active material may correspond to an NCM electrode and may have an SSA between 0.01 m²/g and 0.2 m²/g, and the alternate material may comprise carbon and have an SSA between 150 m²/g and 3500 m²/g. In another example, the active material may correspond to an LFP electrode and may have an SSA between 0.05 m²/g and 15 m²/g, and the alternate material may comprise carbon and have an SSA between 150 m²/g and 3500 m²/g.

In some implementations, the alternate material comprises materials with a lower SSA than what is described above. For example, the alternate material may comprise $Al_2O_3$ and have an SSA between 2 m²/g and 300 m²/g. In another example, the alternate material may comprise carbon and have an SSA between 50 m²/g and 4500 m²/g. In another example, the alternate material may comprise one or more ceramic materials and have an SSA between 200 m²/g and 2000 m²/g. In some implementations, the alternate material comprises materials with an SSA that is more than 50 times larger than the SSA of the active material to facilitate removal of the alternate material. In some implementations, the ease of removal of the alternate material is increased as the difference between the SSA of the alternate material and the SSA of the active material increases. In some implementations, alternate materials with higher SSAs are selected compared to alternate materials with lower SSAs.

In some implementations, active material and alternate material are coated onto a second surface 214b of the foil. For example, a second active material 204b may be coated onto the first portion 206 of the second surface 214b of the foil 202, a third alternate material 208c is coated onto the second portion 210 of the second surface 214b of the foil 202, and a fourth alternate material 208d is coated onto the third portion 216 of the second surface 214b of the foil 202. Although FIG. 3 only displays the second active material 204b coated on the first portion 206 of the second surface 214b of the foil 202, active material may be coated on multiple portions of the second surface 214b of the foil 202. Similarly, although FIG. 3 displays the third alternate material 208c coated on the second portion 210 of the second surface 214b of the foil 202 and the fourth alternate material 208d coated on the third portion 216 of the second surface 214b of the foil 202, alternate material may be coated on more or fewer portions of the second surface 214b of the foil 202.

In some implementations, the first active material 204a and the second active material 204b correspond to a cathode material. In some implementations, the first active material 204a and the second active material 204b correspond to an anode material. In some implementations, all the alternate material (e.g., first alternate material 208a, second alternate material 208b, third alternate material 208c, and fourth alternate material 208d) comprise the same or similar materials. In some implementations, one or more alternate materials may correspond to different materials. For example, the first alternate material 208a and the second alternate material 208b may comprise a first material, and the third alternate material 208c and fourth alternate material 208d may comprise a second material.

In some implementations, the active material and the alternate material on the same surface of the foil have similar thicknesses and compressibility. For example, the first active material 204a, the first alternate material 208a, and the second alternate material 208b are coated on the first surface 214a of the foil 202 and may all have similar thicknesses (e.g., thicknesses with 10 microns) and compressive strength. In some embodiments, materials with similar compressive strengths have similar thickness reductions when undergoing calendering compression. For example, a first material may have a first thickness and the second material may have a second thickness. The first material and the second material may undergo calendering compression between 100 megapascals (MPa) and 250 MPa. The first material's post-calendering thickness may be 80% of the first material's pre-calendering thickness. The second material's post-calendering thickness may also be 80% of the second material's pre-calendering thickness. Accordingly, the first material and the second material may have the same or similar compressibility strength. In some embodiments, compressive strength of two materials may be considered similar if the thickness reductions of the two materials are within 30%. For example, a first material and a second material may have similar compressive strengths if the first material's post-calendering thickness is 90% of the first material's pre-calendering thickness and the second material's post-calendering thickness is 60% of the second material's pre-calendering thickness. In some implementations, the active material and alternate material on the same surface of the foil do not have similar thicknesses or compressibility. In such implementations, the combination of the thickness and compressibility of the alternate material should provide similar stretching (as compared to the active material) to the foil 202 during calendering. For example, the first active material 104a may have a first set of thickness and compressibility attributes and the first alternate material 208a and the second alternate material 208b may have a second set of thickness and compressibility attributes. Although the first set of thickness and compressibility attributes may be different from the second set of thickness and compressibility attributes, both sets may provide similar stretching to the foil 202 during calendering.

Figure 4:
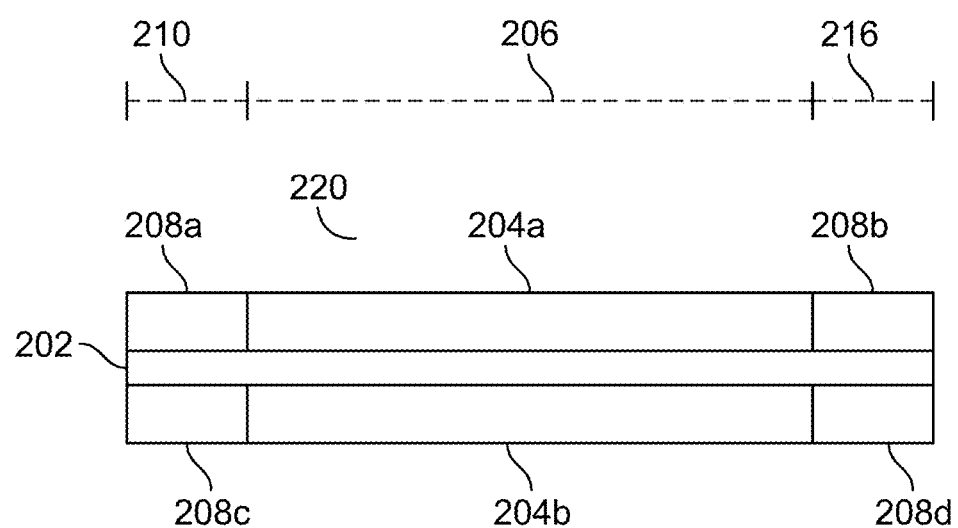
FIG. 4 is a cross section of calendered web material, in accordance with some implementations of the disclosure.

After the active material and the alternate material are coated onto the foil 202, the foil 202 may undergo a calendering process. For example, a pair of opposing rollers may apply a compressive force 212 to the foil 202. The compressive force 212 of the opposing rollers may cause the first portion 206 of the foil 202 coated in the active material (e.g., first active material 204a and second active material 204b) to stretch a similar amount to the second portion 210 and third portion 216 of the foil 202 coated in the alternate material (e.g., first alternate material 208a, second alternate material 208b, third alternate material 208c, and fourth alternate material 208d). As shown in FIG. 4, a resulting calendered web 220 has minimal wrinkles due to the similarity of the stretching of the foil 202 coated in the active material and the stretching of the foil 202 coated in the alternate material. Accordingly, applying the alternate material to the portions (e.g., second portion 210 and third portion 216) of the foil 202 not coated in the active material results in more even pressure during calendering and less wrinkling.

Figure 5:
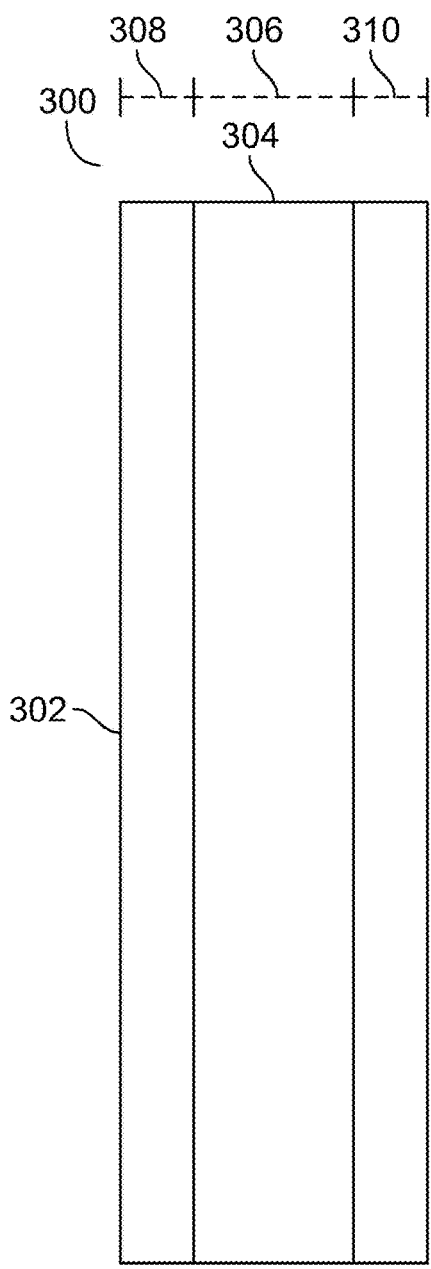
FIG. 5 shows a plan view of foil coated with active material before a calendering process, in accordance with some implementations of the disclosure.

FIG. 5 shows a plan view of a foil 302 coated with active material before a calendering process. In some implementations, FIG. 5 displays a plan view of the same foil (e.g., foil 102) displayed in FIGS. 1 and 2. In some implementations, a pre-calendered web 300 comprises a first active material 304 coated onto a first portion 306 of the foil 302. Although FIG. 5 displays the first active material 304 only coated onto the first portion 306 of the foil 302, in some implementations, the active material may be coated on multiple portions of the foil 302. In some implementations, the first active material 304 corresponds to a cathode material or an anode material.

After the first active material 304 is coated onto the foil 302, the foil 302 may undergo a calendering process. For example, a pair of opposing rollers may apply a compressive force to the foil 302. The compressive force may result in a larger force being applied to the first portion 306 of the foil 302 because the first portion of the foil 302 is coated in the first active material 304 and a smaller force being applied to other portions (other portion 308 and other portion 310) of the foil 302 because the other portions of the foil 302 is not coated with the first active material 304.

Figure 6:
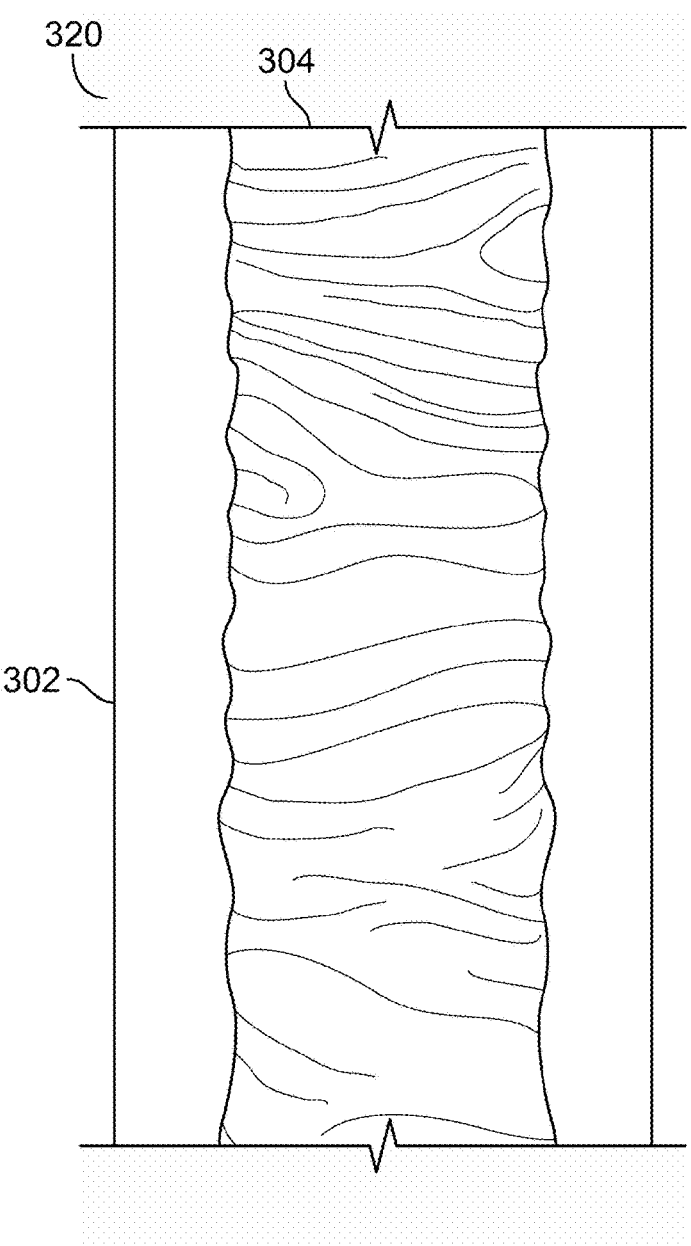
FIG. 6 shows a plan view of foil coated with active material after a calendering process, in accordance with some implementations of the disclosure.

FIG. 6 shows a plan view of foil 302 coated with active material after a calendering process. In some implementations, a calendered web 320 comprising warping in the foil 302. In some implementations, the warping is caused, at least in part, due to different forces being applied to the different portions of the foil 302. In some implementations, the warping hinders subsequent manufacturing steps and/or result in reduced performance in an energy storage device using the calendered web 320.

FIG. 7 shows a plan view of a foil coated with active material and alternate material before calendering. In some implementations, FIG. 7 displays a plan view of the foil (e.g., foil 202) displayed in FIGS. 3 and 4. In some implementations, a pre-calendered web 400 comprises a first active material 404 coated onto a first portion 406 of the foil, a first alternate material 408a coated onto a second portion 410 of the foil, and a second alternate material 408b coated onto a third portion 412 of the foil. Although FIG. 7 only displays active material coated onto the first portion 406 of the foil, in some implementations, active material may be coated on multiple portions of the foil. Similarly, although FIG. 7 displays alternate material coated on the second portion 410 of the foil and the third portion 412 of the foil, in some implementations, alternate material may be coated on more or fewer portions of the foil. In some implementations, the first active material 404 corresponds to a cathode material or an anode material. In some implementations, the alternate material (e.g., first alternate material 408a, second alternate material 408b, etc.) may be any of the alternate materials described herein.

In some implementations, the active material and the alternate material have similar thicknesses and compressibility. For example, the first active material 404, the first alternate material 408a, and the second alternate material 408b may all have similar thickness and compressibility attributes. In some implementations, the active material and alternate material do not have similar thicknesses or compressibility. In such implementations, the combination of the thickness and compressibility of the alternate material should provide similar stretching (as compared to the active material) to the foil during calendering. For example, the first active material 404 may have a first set of thickness and compressibility attributes, and the first alternate material 408a and the second alternate material 408b may have a second set of thickness and compressibility attributes. Although the first set of thickness and compressibility attributes may be different from the second set of thickness and compressibility attributes, both sets may provide similar stretching to the foil during calendering.

After the active material and the alternate material are coated onto the foil, the foil may undergo a calendering process. For example, a pair of opposing rollers may apply a compressive force to the foil. The compressive force of the rollers may cause the first portion 406 of the foil coated in the active material (e.g., first active material 404) to stretch a similar amount to the second portion 410 and third portion 412 of the foil coated in the alternate material (e.g., first alternate material 408a and second alternate material 408b).

FIG. 8 shows a plan view of foil coated with active material and alternate material after calendering. FIG. 8 shows how the resulting web 402 has minimal wrinkles due to the similarity of the stretching of the foil coated in the active material and the stretching of the foil coated in the alternate material. Accordingly, applying the alternate material to the portions (e.g., second portion 410 and third portion 412) of the foil not coated in the active material results in more even pressure during calendering and less wrinkling.

Figure 9:
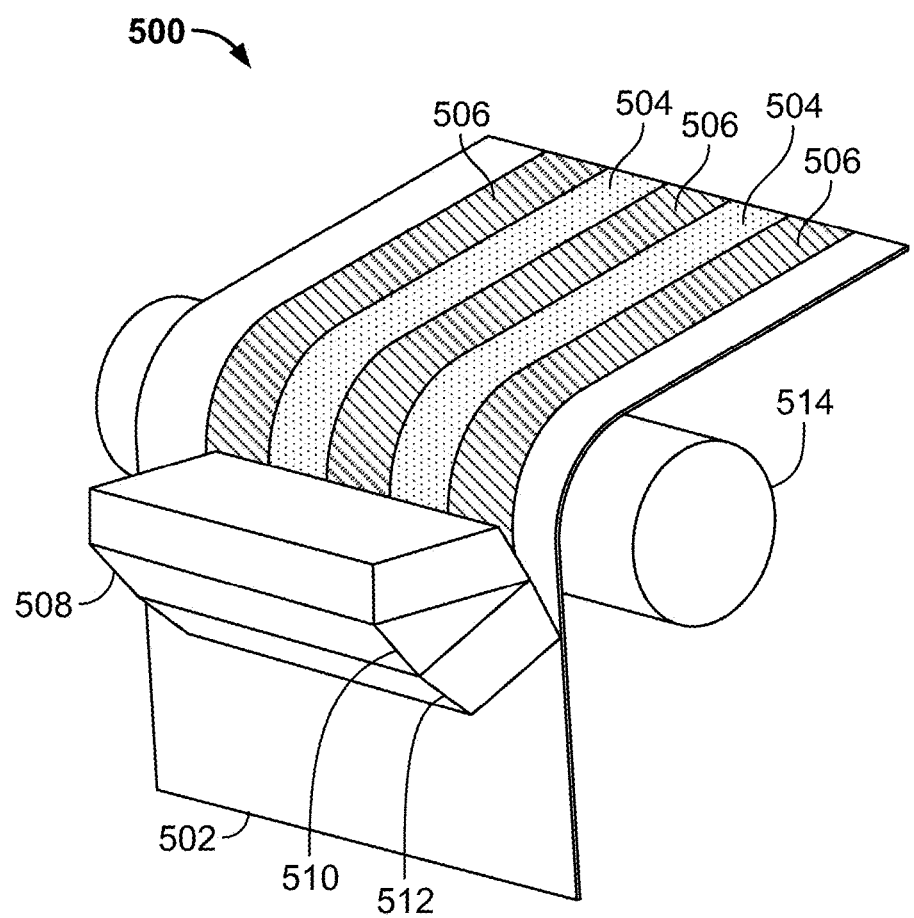
FIG. 9 is a perspective view of an apparatus for applying an alternate material to a foil, in accordance with some implementations of the disclosure.

FIG. 9 is a perspective view of an apparatus 500 for applying alternate material 506 to a foil 502, in accordance with some implementations of the disclosure. In some implementations, the alternate material 506 is applied to the foil 502 using a dual slot die 508. The dual slot die 508 may comprise a first slot 510 and a second slot 512. In some implementations, the first slot 510 comprises active material 504 and the second slot 512 comprises alternate material 506. In other implementations, the first slot 510 may comprise alternate material 506 and the second slot 512 may comprise active material 504. In some implementations, the dual slot die 508 coats the foil 502 with active material 504 and/or alternate material 506 as the foil 502 passes between the dual slot die 508 and a roller 514. For example, the dual slot die 508 may coat the foil 502 with the active material 504 using the first slot 510 and coat the foil 502 with the alternate material 506 using the second slot 512. The dual slot die 508 may coat one or more portions of the foil 502 with active material 504 and may coat one or more other portions of the foil 502 with alternate material 506. Although FIG. 9 displays the active material 504 coated on two portions of the foil 502, the active material 504 may be coated on fewer portions or more portions of the foil 502 than what is shown. Similarly, although FIG. 9 only displays the alternate material 506 coated on three portions of the foil 502, the alternate material 506 may be coated on fewer portions or more portions of the foil 502 than what is shown.

The dual slot die 508 may coat the alternate material 506 and/or active material 504 onto the foil 502 according to one or more dimensions. For example, the dual slot die 508 may coat the alternate material 506 onto the foil 502 according to a first thickness, and the dual slot die 508 may coat the active material 504 onto the foil 502 according to a second thickness. In some implementations, the one or more dimensions are selected to yield a more uniform force across one or more portions of the foil 502 during calendering. In some implementations, the first thickness and the second thickness are the same or similar. In some implementations, the first thickness and the second thickness are different. In another example, the dual slot die 508 may coat the alternate material 506 onto the foil 502 according to a first width, and the dual slot die 508 may coat the active material 504 onto the foil 502 according to a second width. The first width may correspond to how much of the surface of the foil 502 is coated with the active material 504 and the second width may correspond to how much of the surface of the foil 502 is coated with the alternate material 506. In some implementations, the first width and the second width are the same or similar. In some implementations, the first width and the second width are different. In some implementations, the dual slot die 508 may coat different portions of the alternate material 506 and/or active material 504 according to one or more dimensions. For example, the dual slot die 508 may coat a first portion of alternate material onto a first portion of the foil according to a first width and the dual slot die 508 may coat a second portion of alternate material onto a second portion of the foil according to a second width. In some implementations, the first width of the first portion of alternate material and the second width of the second portion of alternate material are the same or similar. In some implementations, the first width of the first portion of alternate material and the second width of the second portion of alternate material are different.

Figure 10:
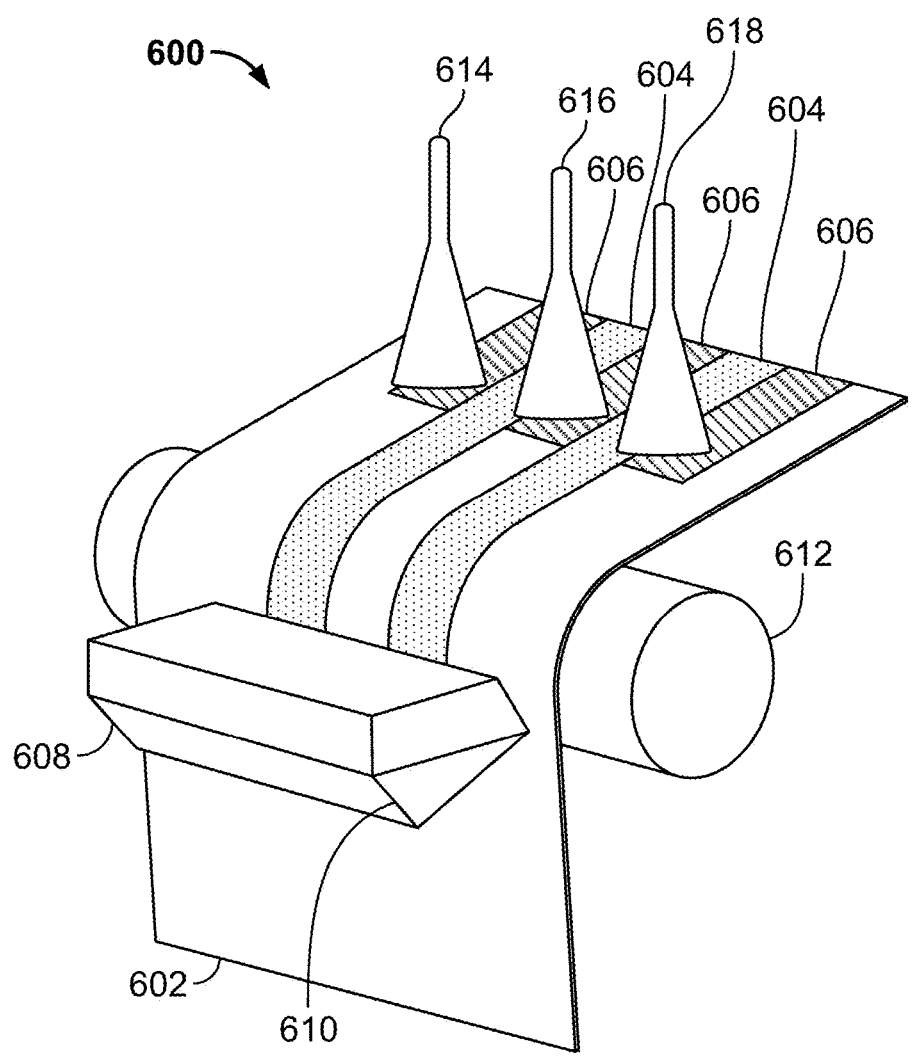
FIG. 10 is a perspective view of another apparatus for applying an alternate material to a foil, in accordance with some implementations of the disclosure.

FIG. 10 is a perspective view of another apparatus 600 for applying alternate material 606 to a foil 602, in accordance with some implementations of the disclosure. In some implementations, the alternate material 606 is applied to the foil 602 using spray coating, and the active material 604 is applied to the foil 602 using a slot die 608. In some implementations, the alternate material 606 is applied to the foil 602 after the active material 604 is applied to the foil 602. In some implementations, the alternate material 606 is applied to the foil 602 before the active material 604 is applied to the foil 602. In some implementations, the slot die 608 coats the foil 602 with active material 604 as the foil 602 passes between the slot die 608 and a roller 612. For example, the slot die 608 may coat the foil 602 with the active material 604 using the first slot 610. The slot die 608 may coat one or more portions of the foil 602 with active material 604. Although FIG. 10 displays the active material 604 coated on two portions of the foil 602, the active material 604 may be coated on fewer portions or more portions of the foil 602 than what is shown.

In some implementations, the alternate material 606 is applied to the foil 602 using one or more nozzles. For example, a first nozzle 614 may coat a first portion of the foil 602 with alternate material, a second nozzle 616 may coat a second portion of the foil 602 with alternate material, and a third nozzle 618 may coat a third portion of the foil 602 with alternate material. Although FIG. 10 displays the alternate material 606 coated on three portions of the foil 602, the alternate material 606 may be coated on fewer portions or more portions of the foil 602 than what is shown.

The one or more nozzles may coat the alternate material 606 onto the foil 602 according to one or more dimensions. In some implementations, the one or more dimensions of the alternate material 606 are the same or similar to one or more dimensions of the active material 604. For example, the slot die 608 may coat the active material 604 onto the foil 602 according to a first thickness, and the one or more nozzles may coat the alternate material 606 onto the foil 602 according to a second thickness that is the same as or similar to the first thickness. In another example, the slot die 608 may coat the active material 604 onto the foil 602 according to a first width, and the one or more nozzles may coat the alternate material 606 onto the foil 602 according to a second width that is the same as or similar to the first width. In some implementations, the one or more dimensions of the alternate material 606 are different from the one or more dimensions of the active material 604. In some implementations, the one or more nozzles may coat different portions of the alternate material 606 according to one or more dimensions. For example, the first nozzle 614 may coat a first portion of alternate material onto a first portion of the foil 602 according to a first width, and the second nozzle 616 may coat a second portion of alternate material onto a second portion of the foil 602 according to a second width. In some implementations, the first width of the first portion of alternate material and the second width of the second portion of alternate material are the same or similar. In some implementations, the first width of the first portion of alternate material and the second width of the second portion of alternate material are different.

In some implementations, the alternate material 606 is coated onto the foil 602 using a second slot die. For example, the slot die 608 may coat the foil 602 with the active material 604, and a second slot die may coat the foil 602 with the alternate material 606.

Figure 11:
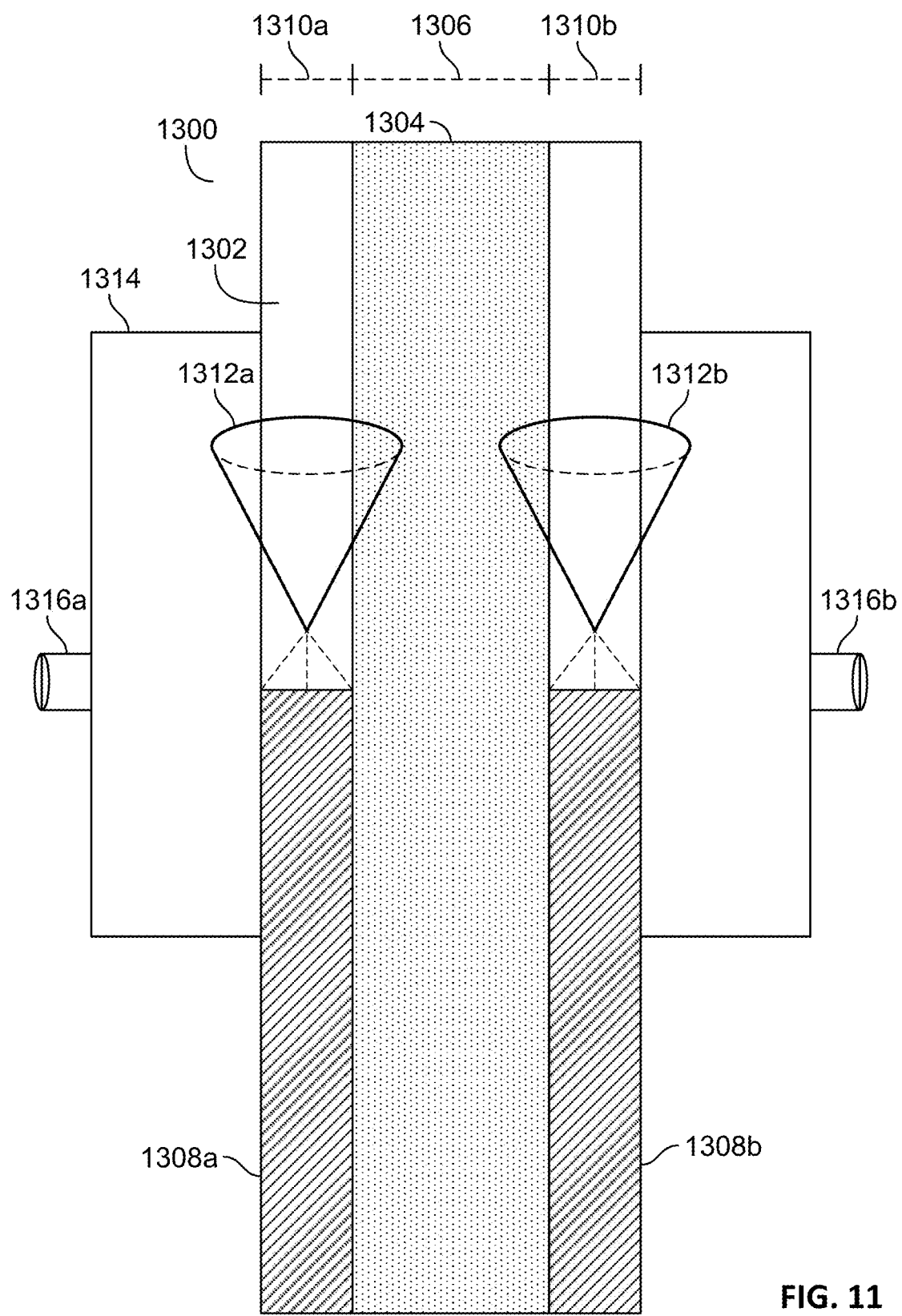
FIG. 11 is a plan view of a system for removing alternate material from a web, in accordance with some implementations of the disclosure.

FIG. 11 is a plan view of a system for removing alternate material from a web 1300, in accordance with some implementations of the disclosure. In some implementations, the web 1300 is the same as or similar to the web (e.g., web 402) described in FIG. 8. The web 1300 may comprise active material 1304 on a first portion 1306 of the foil 1302, a first alternate material 1308*a* on a second portion 1310*a* of the foil 1302, and a second alternate material 1308*b* on a third portion 1310*b* of the foil 1302.

In some implementations, laser ablation is used to remove alternate material from the web 1300. For example, a first laser 1312*a* may remove the first alternate material 1308*a* from the second portion 1310*a* of the foil 1302, and the second laser 1312*b* may remove the second alternate material 1308*b* from the third portion 1310*b* of the foil 1302.

In some implementations, a first vacuum 1316*a* and/or a second vacuum 1316*b* collect alternate material removed by the first laser 1312*a* and/or the second laser 1312*b*. For example, the first vacuum 1316*a* may collect the particles of the first alternate material 1308*a* removed by the first laser 1312*a*, and the second vacuum 1316*b* may collect the particles of the second alternate material 1308*b* removed by the second laser 1312*b*. In some implementations, the first laser 1312*a* and the second laser 1312*b* are housed within a first container 1314. In some implementations, the first container 1314 prevents alternate material particles from escaping the first container 1314. The web 1300 may be fed through the first container 1314 where the alternate material is removed. Accordingly, when the web 1300 exits the first container 1314, the first alternate material 1308*a* and the second alternate material 1308*b* may be removed from the surface of the foil 1302.

Figure 12:
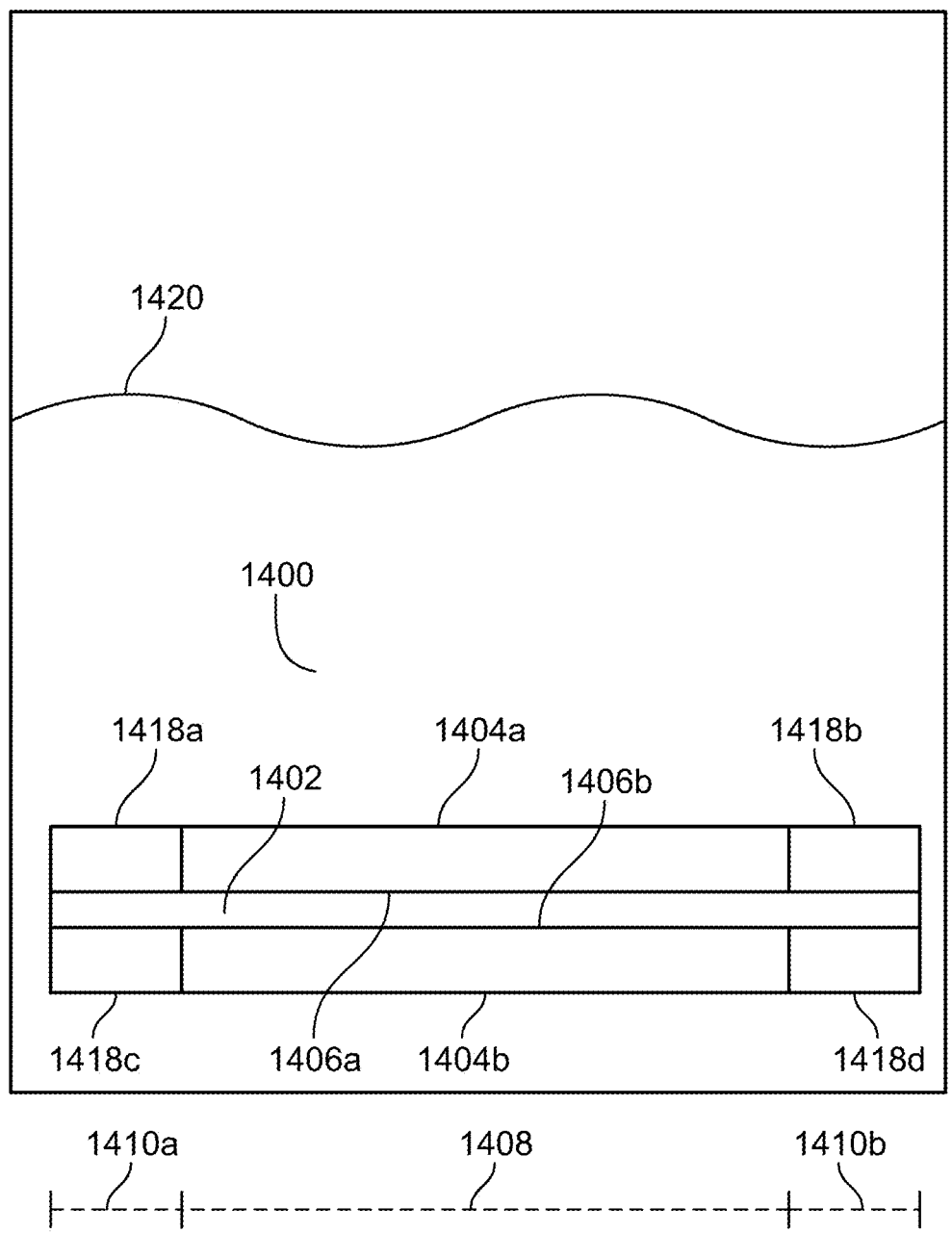
FIG. 12 is a plan view of a system for removing alternate material from a web, in accordance with some implementations of the disclosure.

FIG. 12 is a cross section view of a system for removing alternate material from a web 1400, in accordance with some implementations of the disclosure. In some implementations, the web 1400 is the same or similar to the web (e.g., web 402) described in FIG. 8. The web 1400 may comprise a first active material 1404*a* on a first portion 1408 of a first surface 1406*a* of a foil 1402 and a second active material 1404*b* on the first portion 1408 of a second surface 1406*b* of the foil 1402. The web 1400 may also comprise a first alternate material 1418*a* on a second portion 1410*a* of the first surface 1406*a* of the foil 1402 and a second alternate material 1418*b* on a third portion 1410*b* of the first surface 1406*a* of the foil 1402. The web 1400 may also comprise a third alternate material 1418*c* on the second portion 1410*a* of the second surface 1406*b* of the foil 1402 and a fourth alternate material 1418d on the third portion 1410b of the second surface 1406b of the foil 1402.

In some implementations, the system removes the alternate material using etching. For example, a first solution 1420 may be used to remove the first alternate material 1418a from the second portion 1410a of the first surface 1406a of the foil 1402, the second alternate material 1418b from the third portion 1410b of the first surface 1406a of the foil 1402, the third alternate material 1418c from the second portion 1410a of the second surface 1406b of the foil 1402, and the fourth alternate material 1418d from the third portion 1410b of the second surface 1406b of the foil 1402. In some embodiments, the etching solutions may include hydrofluoric acid, N,N-dimethyl acetamide, nitric acids, sulfuric acids, and/or similar such etching solutions.

Figure 13:
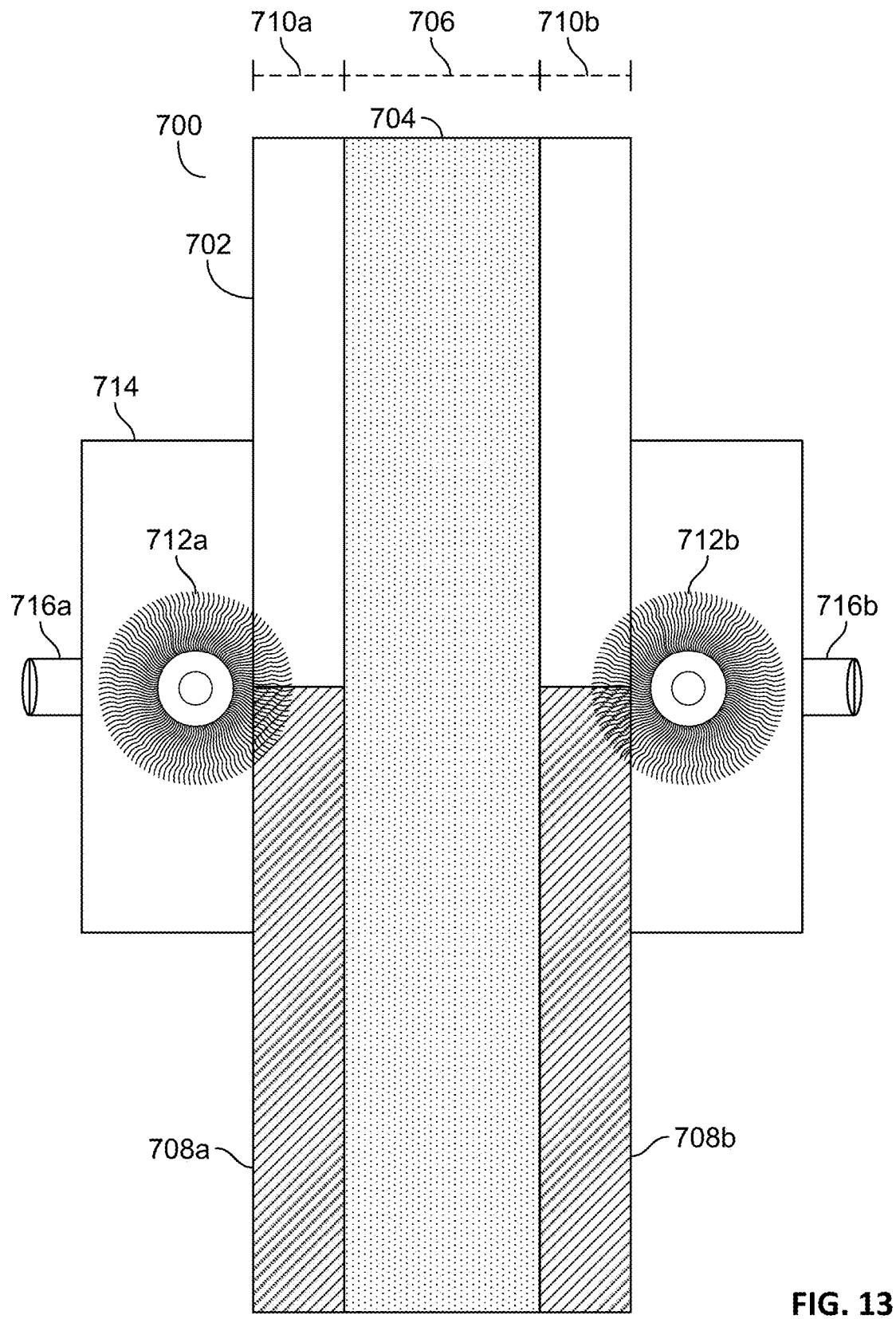
FIG. 13 is a plan view of a system for removing alternate material from a web, in accordance with some implementations of the disclosure.

FIG. 13 is a plan view of a system for removing alternate material from a web 700, in accordance with some implementations of the disclosure. In some implementations, the web 700 is the same or similar to the web (e.g., web 402) described in FIG. 8. The web 700 may comprise active material 704 on a first portion 706 of the foil 702, a first alternate material 708a on a second portion 710a of the foil 702, and a second alternate material 708b on a third portion 710b of the foil 702.

In some implementations, a first brush 712a and a second brush 712b remove alternate material from the web 700. For example, the first brush 712a may remove the first alternate material 708a from the second portion 710a of the foil 702 and the second brush 712b may remove the second alternate material 708b from the third portion 710b of the foil 702. In some implementations, the first brush 712a and/or the second brush 712b remove alternate material by scraping or brushing the alternate material from the surface of the foil 702. Although two brushes are shown, any number of brushes may be used.

In some implementations, the first brush 712a and/or the second brush 712b comprise plastic, copper, nylon, polypropylene, acrylonitrile butadiene styrene (ABS), Polyethylene terephthalate (PET), bronze, brass, aluminum, coconut fiber, Tampico agave plants, bassine, palmyra, goat hair, boar's bristles, and/or similar such materials. In some implementations, the first brush 712a has a diameter between 20 millimeters (mm) and 45 mm. In some implementations, the first brush 712a comprises a plurality of bristles extending from a holder. In some implementations, the bristles have lengths that are between 3 mm and 15 mm and diameters that are between 3 mm and 10 mm.

In some implementations, the first brush 712a and a second brush 712b remove alternate material from the web 700 due, at least in part, to the SSA values of the first alternate material 708a and the second alternate material 708b. For example, the first alternate material 708a and the second alternate material 708b may comprise materials with an SSA that is more than 100 times larger than the SSA of the active material 704 to facilitate removal of the alternate material. In another example, the first alternate material 708a and the second alternate material 708b may comprise materials with an SSA that is more than 50 times larger than the SSA of the active material 704 to facilitate removal of the alternate material. In some implementations, the ease of removal of the first alternate material 708a and the second alternate material 708b is increased as the difference between the SSA of the first alternate material 708a and the second alternate material 708b and the SSA of the active material 704 increases. In some implementations, alternate materials with higher SSAs are selected compared to alternate materials with lower SSAs.

In some implementations, a first vacuum 716a and/or a second vacuum 716b collect alternate material removed by the first brush 712a and/or the second brush 712b. For example, the first vacuum 716a may collect the particles of the first alternate material 708a removed by the first brush 712a and the second vacuum 716b may collect the particles of the second alternate material 708b removed by the second brush 712b. In some implementations, the first brush 712a and the second brush 712b are housed within a first container 714. In some implementations, the first container 714 prevents alternate material particles from escaping the first container 714. The web 700 may be fed through the first container 714 where the alternate material is removed. Accordingly, when the web 700 exits the first container 714, the first alternate material 708a and the second alternate material 708b may be removed from the surface of the foil 702.

Figure 14:
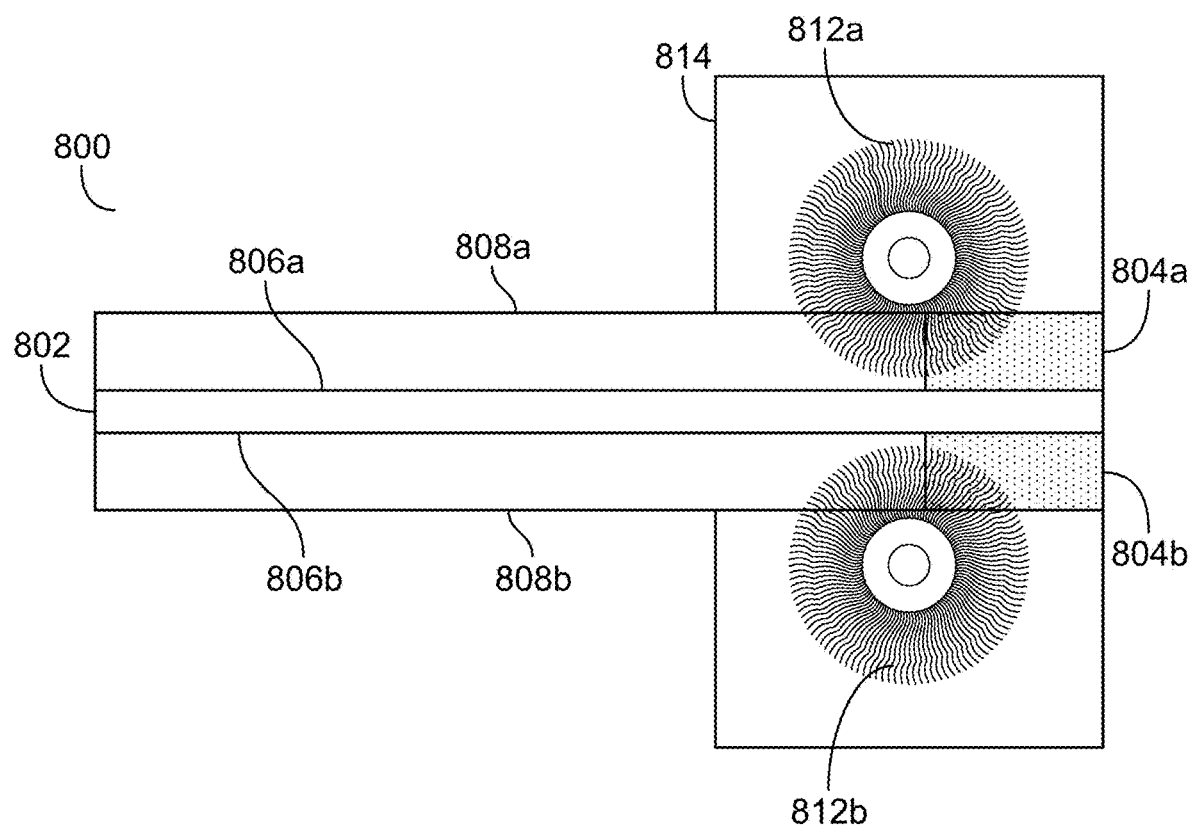
FIG. 14 is a cross section of a system for removing alternate material from a web, in accordance with some implementations of the disclosure.

FIG. 14 is a cross section of a system for removing alternate material from a web 800, in accordance with some implementations of the disclosure. In some implementations, the web 800 is the same or similar to the web (e.g., web 402) described in FIG. 8. The web 800 may comprise a first active material 804a on a first portion of a first surface 806a of a foil 802 and a second active material 804b on the first portion of a second surface 806b of the foil 802. The web 800 may also comprise a first alternate material 808a on a second portion of the first surface 806a of the foil 802 and a second alternate material 808b on the second portion of the second surface 806b of the foil 802.

In some implementations, a first brush 812a and a second brush 812b remove alternate material from the web 800. For example, the first brush 812a may remove the first alternate material 808a from the first surface 806a of the foil 802, and the second brush 812b may remove the second alternate material 808b from the second surface 806b of the foil 802. In some implementations, the first brush 812a and/or the second brush 812b removes alternate material by scraping or brushing the alternate material from the surfaces of the foil 802. Although two brushes are shown, any number of brushes may be used. For example, there may be two brushes removing alternate material from the first surface 806a of the foil 802 and two additional brushes removing alternate material from the second surface 806b of the foil 802.

In some implementations, one or more vacuums collect alternate material removed by the first brush 812a and/or the second brush 812b. For example, a first vacuum may collect the particles of the first alternate material 808a removed by the first brush 812a and a second vacuum may collect the particles of the second alternate material 808b removed by the second brush 812b. In some implementations, the first brush 812a, the second brush 812b, and/or the one or more vacuums are housed within a first container 814. In some implementations, the first container 814 prevents alternate material particles from escaping the first container 814. The web 800 may be fed through the first container 814 where the alternate material is removed. Accordingly, when the web 800 exits the first container 814 the first alternate material 808a and the second alternate material 808b may be removed from the surfaces of the foil 802.

Figure 15:
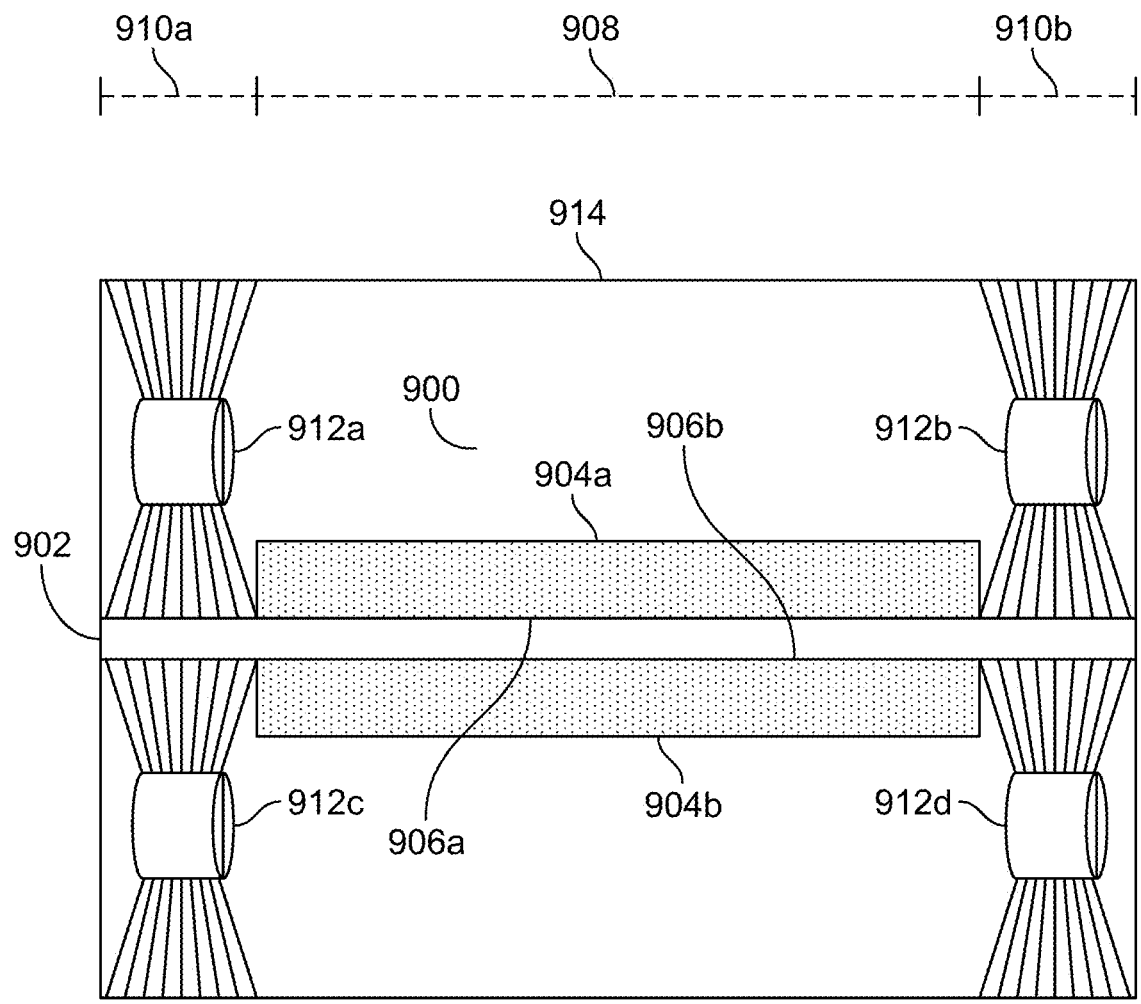
FIG. 15 is a cross section of a system for removing alternate material from a web, in accordance with some implementations of the disclosure.

FIG. 15 is a cross section of a system for removing alternate material from a web 900, in accordance with some implementations of the disclosure. In some implementations, the web 900 is the same or similar to the web (e.g., web 402) described in FIG. 8. The web 900 may comprise a first active material 904a on a first portion 908 of a first surface 906a of a foil 902 and a second active material 904b on the first portion 908 of a second surface 906b of the foil 902.

In some implementations, a first brush 912a and/or a second brush 912b remove alternate material from the first surface 906a of the foil 902. For example, the first brush 912a may remove alternate material from a second portion 910a of the first surface 906a of the foil 902 and the second brush 912b may remove alternate material from a third portion 910b of the first surface 906a of the foil 902. In some implementations, a third brush 912c and/or a fourth brush 912d remove alternate material from the second surface 906b of the foil 902. For example, the third brush 912c may remove alternate material from the second portion 910a of the second surface 906b of the foil 902, and the fourth brush 912d may remove alternate material from the third portion 910b of the second surface 906b of the foil 902. Although four brushes are shown, any number of brushes may be used.

In some implementations, one or more vacuums (not shown in FIG. 15) collect alternate material removed by one or more brushes. For example, a first vacuum may collect the particles of alternate material removed by the first brush 912a and the second brush 912b, and a second vacuum may collect the particles of alternate material removed by the third brush 912c and the fourth brush 912d. In another example, a first vacuum may collect the particles of alternate material removed by the first brush 912a, a second vacuum may collect the particles of alternate material removed by the second brush 912b, a third vacuum may collect the particles of alternate material removed by the third brush 912c, and a fourth vacuum may collect the particles of alternate material removed by the fourth brush 912d. In some implementations, the first brush 912a, the second brush 912b, the third brush 912c, the fourth brush 912d, and/or the one or more vacuums are housed within a first container 914. In some implementations, the first container 914 prevents alternate material particles from escaping the first container 914. The web 900 may be fed through the first container 914 where the alternate material is removed. Accordingly, when the web 900 exits the first container 914, the alternate material is removed from the surfaces of the foil 902. In some implementations, the first brush 912a and the second brush 912b are housed within a different container than the third brush 912c and the fourth brush 912d.

Figure 16:
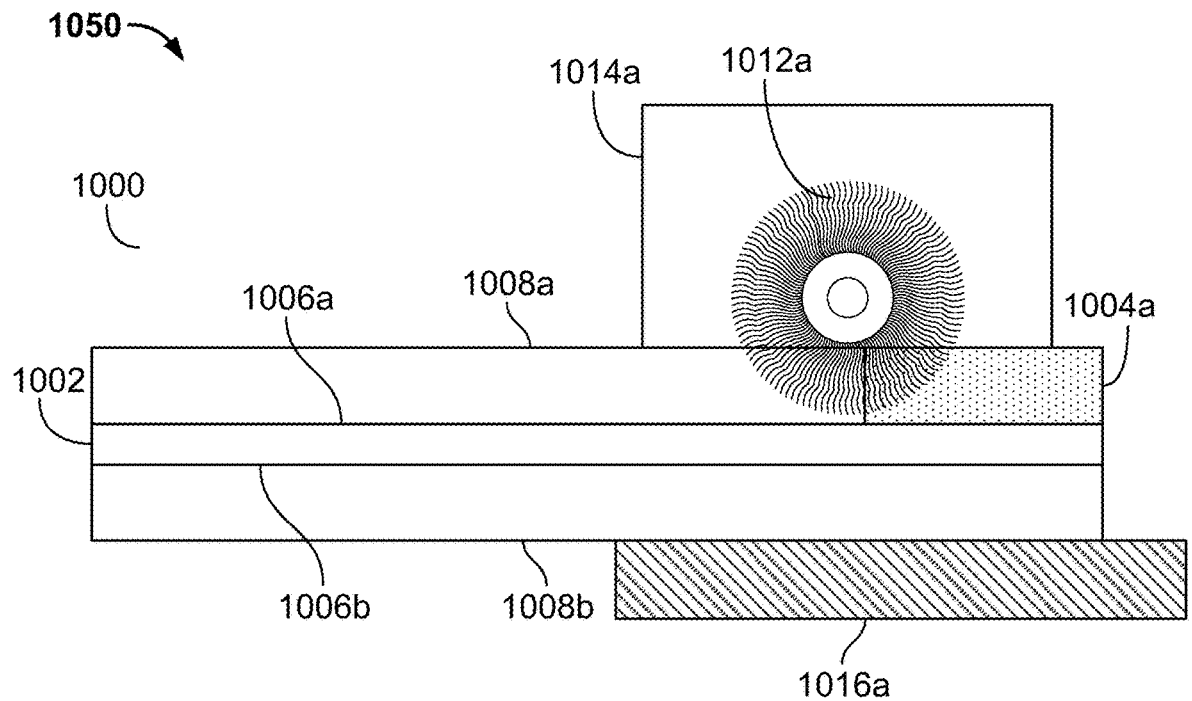
FIG. 16 is a cross section of a system for removing alternate material from a web, in accordance with some implementations of the disclosure.

FIG. 16 shows cross sections of a system for removing alternate material from a web 1000, in accordance with some implementations of the disclosure. In some implementations, the web 1000 is the same or similar to the web (e.g., web 402) described in FIG. 8. The web 1000 may comprise a first active material 1004a on a first portion of a first surface 1006a of a foil 1002 and a second active material 1004b on the first portion of a second surface 1006b of the foil 1002. The web 1000 may also comprise a first alternate material 1008a on a second portion of the first surface 1006a of the foil 1002 and a second alternate material 1008b on the second portion of the second surface 1006b of the foil 1002.

In some implementations, the system comprises a first segment 1050. In some implementations, the first segment 1050 comprises a first brush 1012a that removes the first alternate material 1008a from the first surface 1006a of the foil 1002. For example, the web 1000 may be fed through the first container 1014a where the first brush 1012a removes the first alternate material 1008a. In some implementations, a first member 1016a is used to support the web 1000 during brushing. The first member 1016a may allow the first brush 1012a to impose a sufficient brushing force while minimizing stretching or damage to the foil 1002. In some implementations, one or more vacuums (not shown) collect alternate material removed by the first brush 1012a. In some implementations, the first member 1016a provides stability to the web 1000 while the one or more vacuums collect alternate material. In some implementations, the first brush 1012a, the one or more vacuums, and/or the first member 1016a are housed within the first container 1014a. In some implementations, a part of the first brush 1012a, a part of the one or more vacuums, and/or a part of the first member 1016a are housed within the first container 1014a. In some implementations, the first container 1014a prevents alternate material particles from escaping the first container 1014a.

Figure 17:
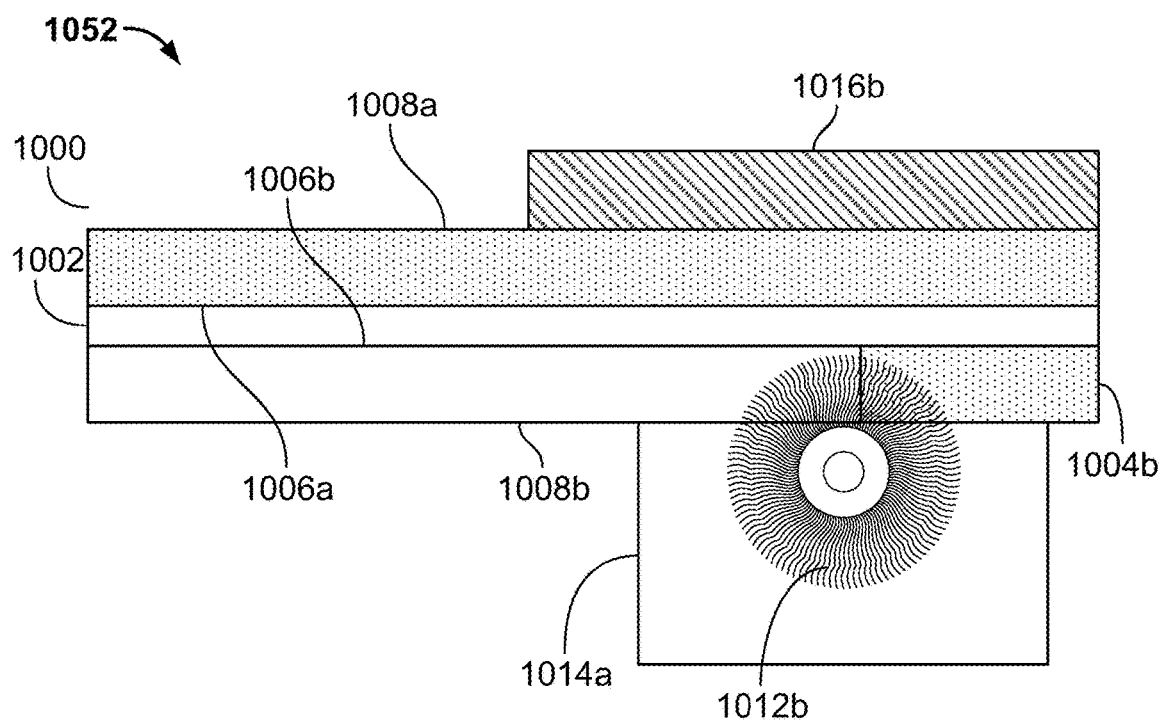
FIG. 17 is a cross section of a system for removing alternate material from a web, in accordance with some implementations of the disclosure.

FIG. 17 shows cross sections of a system for removing alternate material from the web 1000, in accordance with some implementations of the disclosure. In some implementations, FIG. 17 displays a second segment 1052 of the system shown in FIG. 16. In some implementations, the second segment 1050 comprises a second brush 1012b that removes the second alternate material 1008b from the second surface 1006b of the foil 1002. In some implementations, the second brush 1012b removes the second alternate material 1008b after the first brush 1012a removes the first alternate material 1008a. In some implementations, a second member 1016b is used to support the web 1000 during brushing. The second member 1016b may allow the second brush 1012b to impose a sufficient brushing force while minimizing stretching or damage to the foil 1002. In some implementations, one or more vacuums collect alternate material removed by the second brush 1012b. In some implementations, the second member 1016b provides stability to the web 1000 while the one or more vacuums collect alternate material. In some implementations, the second brush 1012b, the one or more vacuums, and/or the second member 1016b are housed within a second container 1014b. In some implementations, a part of the second brush 1012b, a part of the one or more vacuums, and/or a part of the second member 1016b are housed within a second container 1014b. In some implementations, the second container 1014b prevents alternate material particles from escaping the second container 1014b.

Although two brushes and two members are shown, any number of brushes or members may be used. For example, there may be two brushes removing alternate material from the first surface 1006a of the foil 1002 and two additional brushes removing alternate material from the second surface 1006b of the foil 1002. In such an example, there may be one member (e.g., first member 1016a) to support the web 1000 while two brushes remove alternate material from the first surface 1006a of the foil 1002, and there may be another member (e.g., second member 1016b) to support the web 1000 while the two additional brushes remove alternate material from the second surface 1006b of the foil 1002. In another example, there may be two members to support the web 1000 while two brushes remove alternate material from the first surface 1006a of the foil 1002, and there may be another two members to support the web 1000 while the two additional brushes remove alternate material from the second surface 1006b of the foil 1002.

Figure 18:
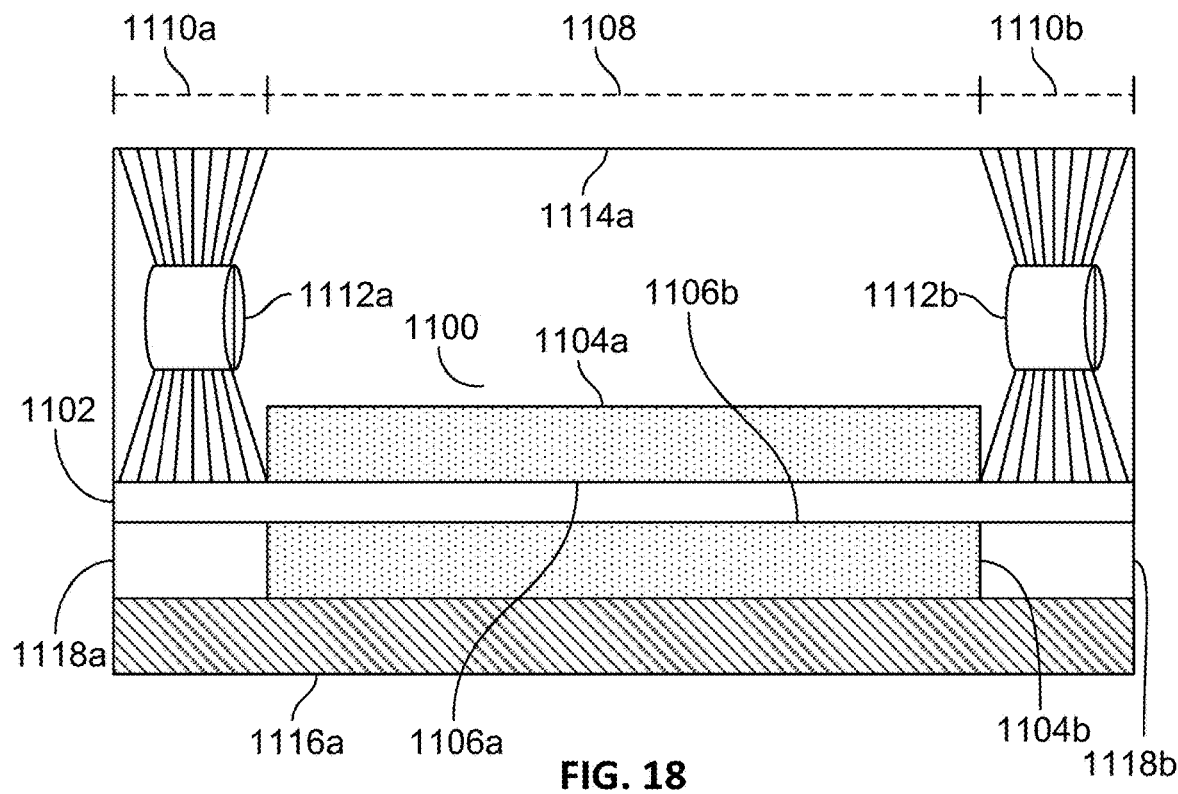
FIG. 18 is a cross section of a system for removing alternate material from a web, in accordance with some implementations of the disclosure.

FIG. 18 shows a cross section of a system for removing alternate material from a web 1100, in accordance with some implementations of the disclosure. In some implementations, the web 1100 is the same or similar to the web (e.g., web 402) described in FIG. 8. The web 1100 may comprise a first active material 1104a on a first portion 1108 of a first surface 1106a of a foil 1102 and a second active material 1104b on the first portion 1108 of a second surface 1106b of the foil 1002. The web 1100 may also comprise alternate material on a second portion 1110*a* of the first surface 1106*a* of the foil 1102 and a third portion 1110*b* of the first surface 1106*a* of the foil 1102. The web 1100 may also comprise a first alternate material 1118*a* on the second portion 1110*a* of the second surface 1106*b* of the foil 1102 and a second alternate material 1118*b* on the third portion 1110*b* of the second surface 1106*b* of the foil 1102.

In some implementations, the system comprises a first segment 1150. In some implementations, the first segment 1150 comprises a first brush 1112*a* and/or a second brush 1112*b* that remove alternate material from the first surface 1106*a* of the foil 1102. For example, the first brush 1112*a* may remove alternate material from the second portion 1110*a* of the first surface 1106*a* of the foil 1102, and the second brush 1112*b* may remove alternate material from the third portion 1110*b* of the first surface 1106*a* of the foil 1102. In some implementations, a first member 1116*a* is used to support the web 1100 during brushing. The first member 1116*a* may allow the first brush 1112*a* and/or the second brush 1112*b* to impose a sufficient brushing force while minimizing stretching or damage to the foil 1102. In some implementations, one or more vacuums (not shown) collect alternate material removed by the first brush 1012*a* and/or the second brush 1112*b*. In some implementations, the first member 1116*a* provides stability to the web 1100 while the one or more vacuums collect alternate material. In some implementations, the first brush 1112*a*, the second brush 1112*b*, the one or more vacuums, and/or the first member 1116*a* are housed within a first container 1114*a*. In some implementations, the first container 1114*a* prevents alternate material particles from escaping the first container 1114*a*.

Figure 19:
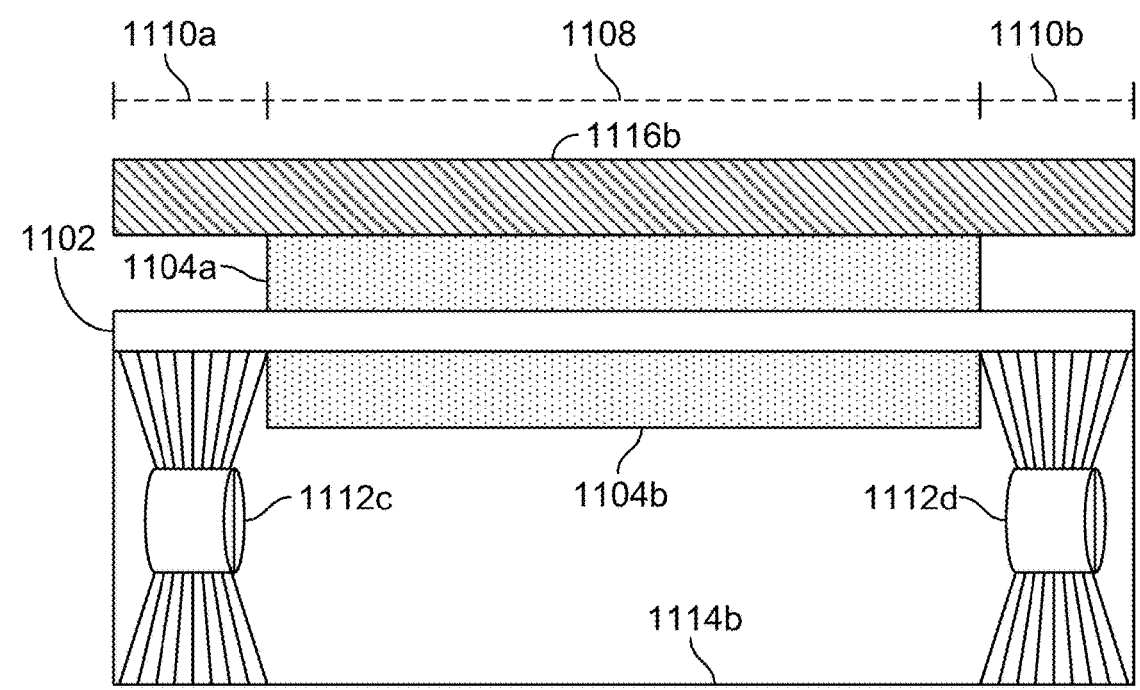
FIG. 19 is a cross section of a system for removing alternate material from a web, in accordance with some implementations of the disclosure.

FIG. 19 shows a cross section of a system for removing alternate material from a web 1100, in accordance with some implementations of the disclosure. In some implementations, FIG. 19 displays a second segment 1152 of the system shown in FIG. 18. In some implementations, the second segment 1152 comprises a third brush 1112*c* that removes the first alternate material 1118*a* from the second portion 1110*a* of the second surface 1106*b* of the foil 1102 and a fourth brush 1112*d* that removes the second alternate material 1118*b* from the third portion 1110*b* of the second surface 1106*b* of the foil 1102. In some implementations, the third brush 1112*c* and/or the fourth brush 1112*d* remove the alternate material from the second surface 1106*b* of the foil 1102 after the first brush 1112*a* and/or the second brush 1112*b* remove the alternate material from the first surface 1106*a* of the foil 1102. In some implementations, a second member 1116*b* is used to support the web 1100 during brushing. The second member 1116*b* may allow the third brush 1112*c* and/or the fourth brush 1112*d* to impose a sufficient brushing force while minimizing stretching or damage to the foil 1102. In some implementations, one or more vacuums (not shown) collect alternate material removed by the third brush 1112*c* and/or the fourth brush 1112*d*. In some implementations, the second member 1116*b* provides stability to the web 1100 while the one or more vacuums collect alternate material. In some implementations, the third brush 1112*c*, the fourth brush 1112*d*, and/or the one or more vacuums are housed within a second container 1114*b*. In some implementations, the second container 1114*b* prevents alternate material particles from escaping the second container 1114*b*.

Figure 20:
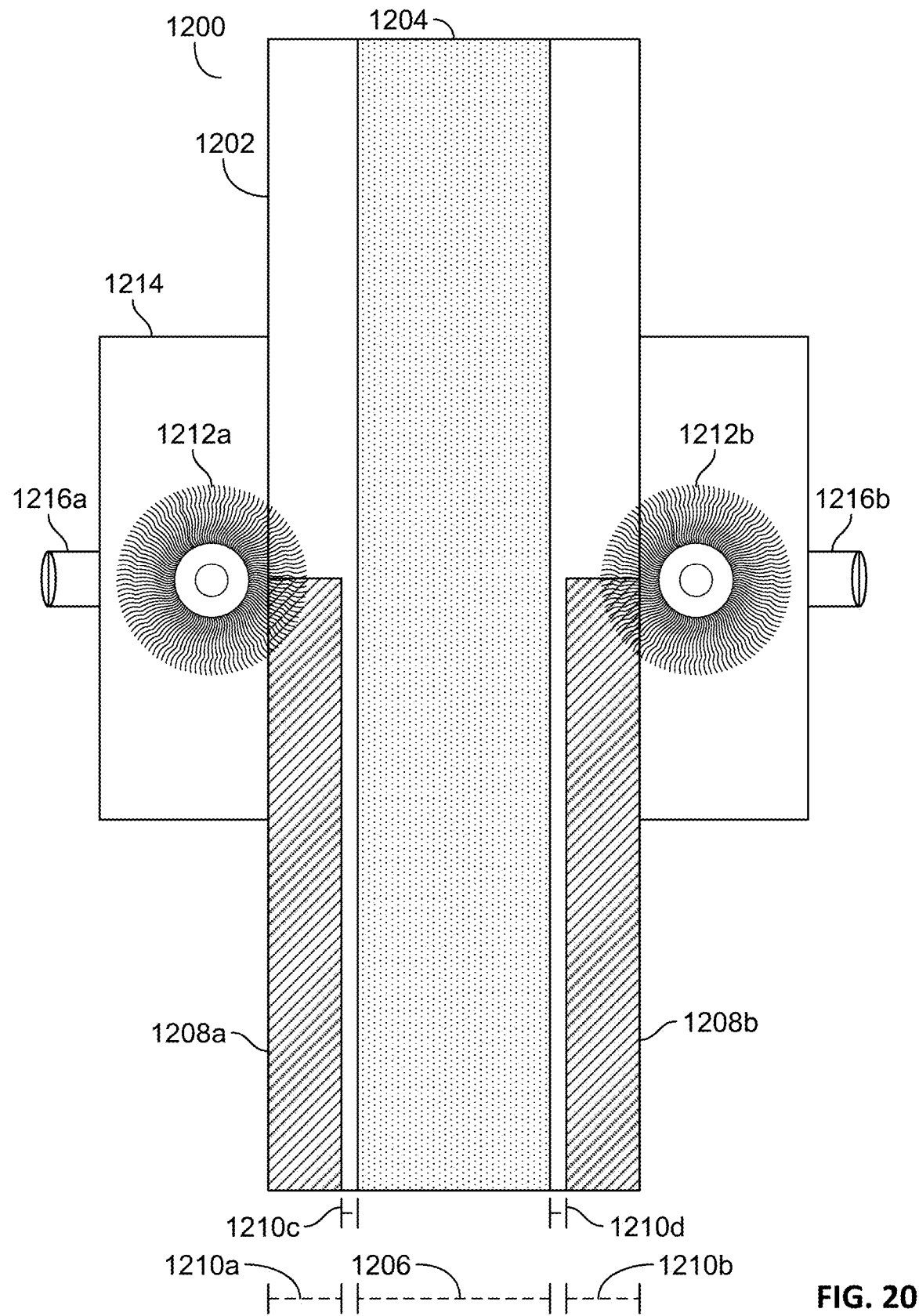
FIG. 20 is a plan view of a system for removing alternate material from a web, in accordance with some implementations of the disclosure.

FIG. 20 is a plan view of a system for removing alternate material from a web 1200, in accordance with some implementations of the disclosure. In some implementations, the web 1200 is the same or similar to the web (e.g., web 402) described in FIG. 8. The web 1200 may comprise active material 1204 on a first portion 1206 of the foil 1202, a first alternate material 1208*a* on a second portion 1210*a* of the foil 1202, and a second alternate material 1208*b* on a third portion 1210*b* of the foil 1202.

In some implementations, a first brush 1212*a* and a second brush 1212*b* remove alternate material from the web 1200. For example, the first brush 1212*a* may remove the first alternate material 1208*a* from the second portion 1210*a* of the foil 1202, and the second brush 1212*b* may remove the second alternate material 1208*b* from the third portion 1210*b* of the foil 1202. In some implementations, a first brush 1212*a* and a second brush 1212*b* remove alternate material from the web 1200 after the web 1200 undergoes an ablation process. For example, laser ablation may be used to remove material (e.g., active material 1204 and/or first alternate material 1208*a*) from a fourth portion 1210*c* of the foil 1202. In another example, laser ablation may be used to remove material (e.g., active material 1204 and/or second alternate material 1208*b*) from a fifth portion 1210*d* of the foil 1202. In some implementations, the ablation process results in a defined edge of the active material (e.g., active material 1204).

In some implementations, a first vacuum 1216*a* and/or a second vacuum 1216*b* collect alternate material removed by the first brush 1212*a* and/or the second brush 1212*b*. In some implementations, the first vacuum 1216*a* and the second vacuum 1216*b* are connected to a first container 1214. In some implementations, the first container 1214 prevents alternate material particles from escaping the first container 1214. The web 1200 may be fed through the first container 1214 where the alternate material is removed. Accordingly, when the web 1200 exits the first container 1214, the first alternate material 1208*a* and the second alternate material 1208*b* may be removed from the surface of the foil 1202.

Figure 21:
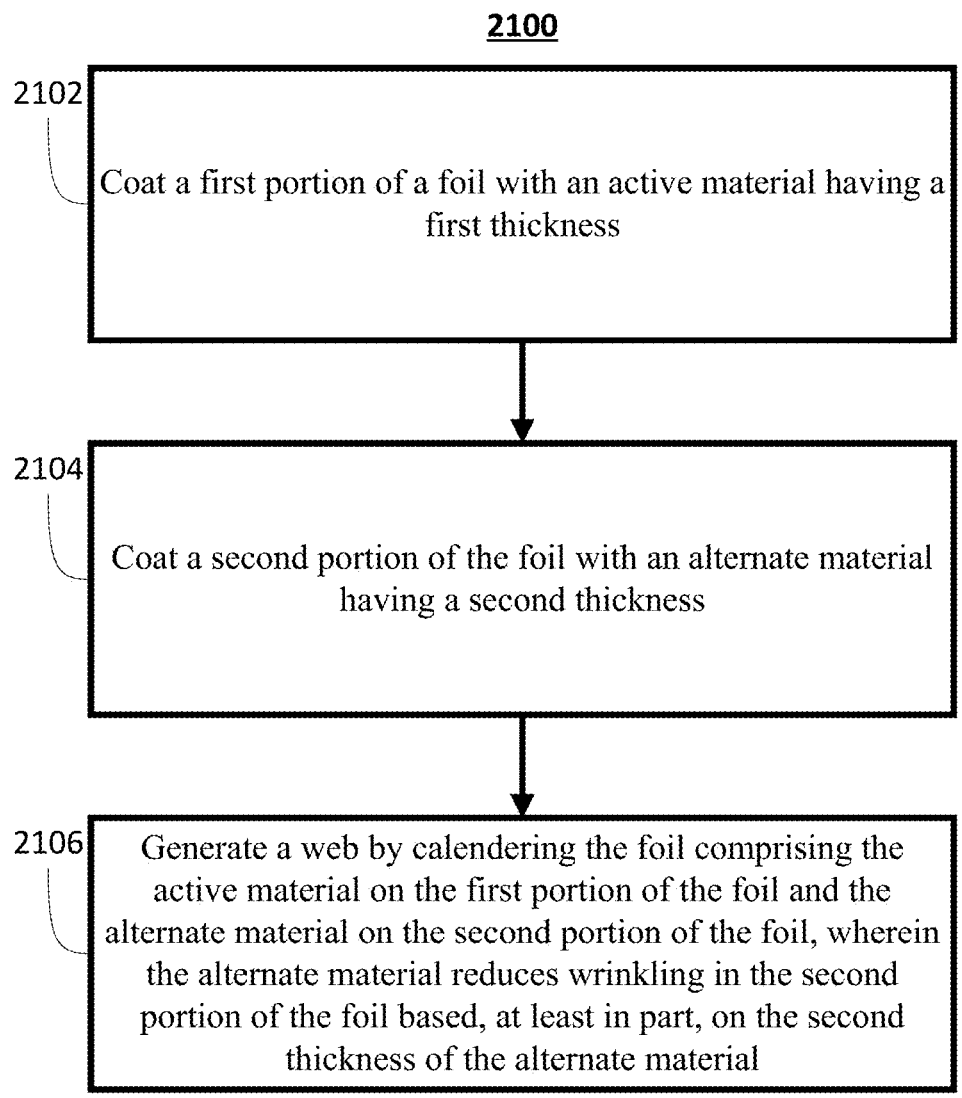
FIG. 21 is an illustrative flowchart of a process for applying alternate material to a foil to provide uniform pressure during calendering, in accordance with some implementations of the disclosure.

FIG. 21 is an illustrative flowchart of a process 2100 for applying alternate material to a foil to provide uniform pressure during calendering, in accordance with some implementations of the disclosure. Process 2100, and any of the following processes, may be executed by one or more of the systems or devices described herein. Although the processes are illustrated and described as a sequence of steps, it is contemplated that various implementations of the processes may be performed in any order or combination and need not include all the illustrated steps.

At 2102, a first portion of a foil is coated with an active material having a first thickness. For example, the active material may be coated onto the first portion of the foil using a slot die or spray coating. In some implementations, the active material is also coated onto other portions of the foil. The other portions may be on the same surface of the foil and/or may be on a different surface of the foil. In some implementations, the active material corresponds to a cathode material. In some implementations, the active material corresponds to an anode material. In some implementations, the first thickness is between 30 μm and 140 μm.

At 2104, a second portion of the foil is coated with an alternate material having a second thickness. For example, the alternate material may be coated onto the second portion of the foil using a slot die or spray coating. In some implementations, the alternate material is coated onto the foil after the active material is coated onto the foil. In some implementations, the alternate material is coated onto the foil before the active material is coated onto the foil. In some implementations, the alternate material is coated onto the foil at substantially the same time as the active material is coated onto the foil. For example, a first slot of a dual slot die may coat the active material onto the foil and a second slot of the dual slot die may coat the alternate material onto the foil. In some implementations, the alternate material is also coated onto other portions of the foil. The other portions may be on the same surface of the foil and/or may be on a different surface of the foil. In some implementations, the alternate material corresponds to any of the alternate materials described herein. In some implementations, the second thickness is between 20 µm and 150 µm.

In some implementations, the active material and the alternate material that are on the same surface of the foil have similar thicknesses and/or compressibility. For example, the active material and the alternate material may be coated on a first surface of the foil and may have similar thickness and compressibility attributes. In some implementations, the active material and alternate material on the same surface of the foil do not have similar thicknesses and/or compressibility. In such implementations, the combination of the thickness and compressibility of the alternate material should provide similar stretching (as compared to the active material) to the foil during calendering. For example, the active material may have a first set of thickness and compressibility attributes and the alternate material may have a second set of thickness and compressibility attributes. Although the first set of thickness and compressibility attributes may be different than the second set of thickness and compressibility attributes, both sets may provide similar stretching to the foil during calendering.

At 2106, a web is generated by calendering the foil comprising the active material on the first portion of the foil and the alternate material on the second portion of the foil, wherein the alternate material reduces wrinkling in the second portion of the foil based, at least in part, on the second thickness of the alternate material. In some implementations, the foil is calendered using a pair of opposing rollers that apply a compressive force to the foil. The compressive force applied by the opposing rollers may cause the first portion of the foil coated in the active material to stretch a similar amount to the second portion of the foil coated in the alternate material. The resulting web may have minimal wrinkles due to the similarity of the stretching of the foil coated in the active material and the stretching of the foil coated in the alternate material. Accordingly, applying the alternate material to the portions of the foil not coated in the active material results in more even pressure during calendering and less wrinkling.

FIG. 22 is an illustrative flowchart of another process 2200 for applying alternate material to a foil to provide uniform pressure during calendering, in accordance with some implementations of the disclosure.

At 2202, a first portion of a foil is coated with an active material having a first thickness. In some implementations, the first portion of the foil is coated with the active material using the same or similar methodologies described at step 2102 above.

At 2204, a second portion of the foil is coated with an alternate material having a second thickness. At 2206, a third portion of the foil is coated with an alternate material having the second thickness. In some implementations, the first portion of the foil is between the second portion of the foil and the third portion of the foil. In some implementations, the second and third portions of the foil are coated with the alternate material using the same or similar methodologies described at step 2104 above.

At 2208, the foil coated with the active material and the alternate material is dried. For example, the foil may be dried in an oven heated to between 80° C. and 120° C. In some implementations, the heating of the foil causes the active material to dry and have the first thickness. In some implementations, the heating of the foil causes the alternate material to dry and have the second thickness.

At 2210, a web is generated by calendering the foil comprising the active material on the first portion of the foil and the alternate material on the second and third portions of the foil, wherein the alternate material reduces wrinkling in the second and third portions of the foil. In some implementations, the foil is calendered using the same or similar methodologies described at step 2106 above.

At 2212, the web is slit into one or more electrodes. In some implementations, the web is inserted in a slitting machine in which the web is slit into a plurality of electrodes. The cutting process may be carried out by one or more blades.

Figure 23:
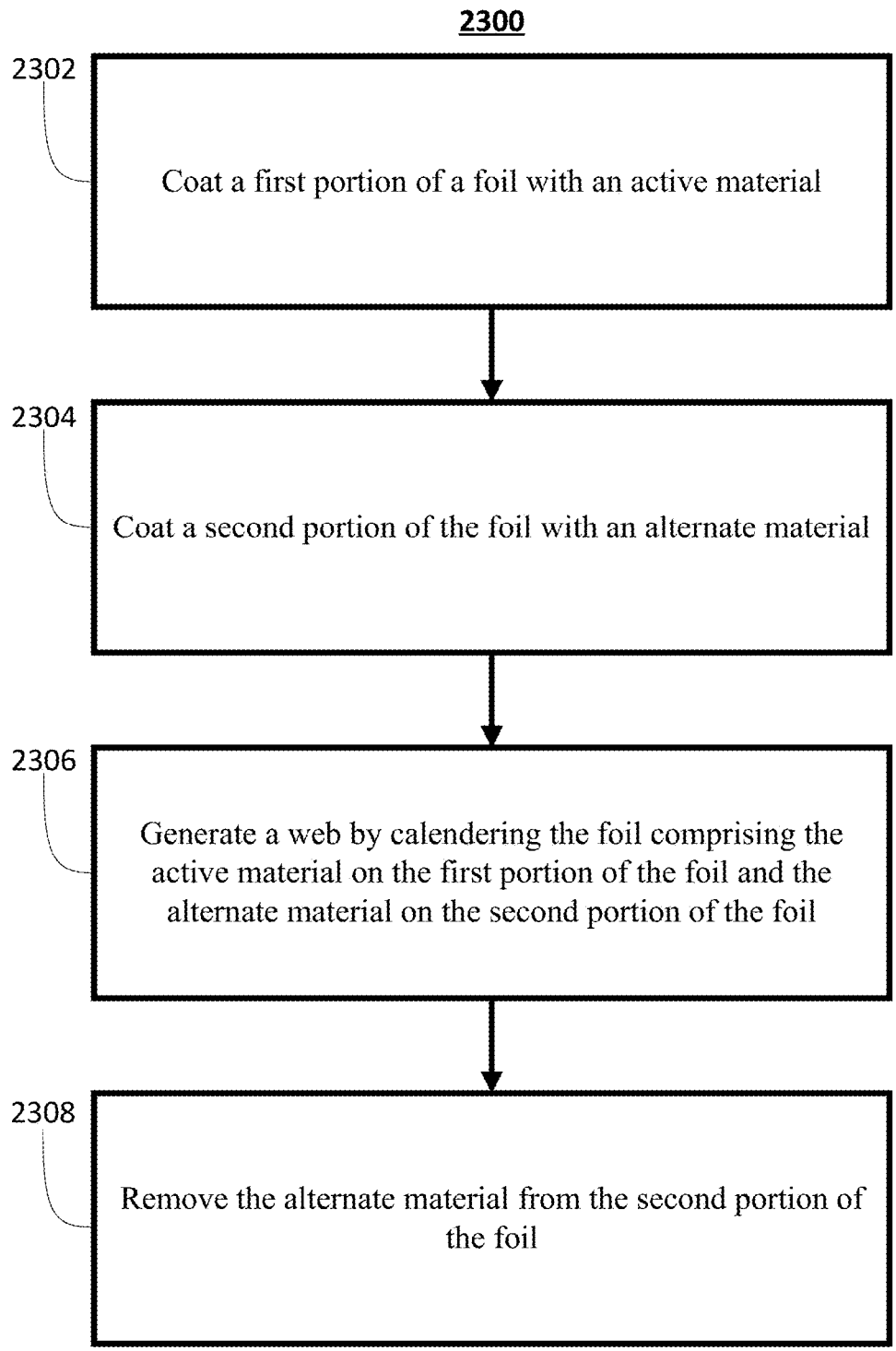
FIG. 23 is an illustrative flowchart of a process for removing alternate material from a foil, in accordance with some implementations of the disclosure.

FIG. 23 is an illustrative flowchart of a process 2300 for removing alternate material from a foil, in accordance with some implementations of the disclosure.

At 2302, a first portion of a foil is coated with an active material having a first thickness. In some implementations, the first portion of the foil is coated with the active material using the same or similar methodologies described at step 2102 above.

At 2304, a second portion of the foil is coated with an alternate material having a second thickness. In some implementations, the second portion of the foil is coated with the alternate material using the same or similar methodologies described at step 2104 above.

At 2306, a web is generated by calendering the foil comprising the active material on the first portion of the foil and the alternate material on the second portion of the foil. In some implementations, the web is generated using the same or similar methodologies described at step 2106 above.

At 2308, the alternate material is removed from the second portion of the foil. In some implementations, the alternate material is removed from the second portion of the foil using laser ablation. In some implementations, the alternate material is removed from the second portion of the foil using etching. For example, wet etching and/or dry etching may be used to remove the alternate material from the second portion of the foil.

In some implementations, the first brush removes the alternate material from the second portion of the foil by scraping or brushing the alternate material from the surface of the second portion of the foil. In some implementations, the first brush removes alternate material from the foil due, at least in part, to the SSA value of the alternate material being larger than the SSA value of the active material. For example, the alternate material may comprise materials with an SSA that is more than 100 times larger than the SSA of the active material to facilitate removal of the alternate material. In another example, the alternate material may comprise materials with an SSA that is more than 50 times larger than the SSA of the active material to facilitate removal of the alternate material. In some implementations, a first vacuum collects the alternate material removed by the first brush. In some implementations, a first member is used to support the web during brushing. The first member may allow the first brush to impose a sufficient brushing force while minimizing stretching or damage to the foil of the web. In some implementations, the first brush, the first vacuum, and/or the first member are housed within a first container. In some implementations, the first container prevents alternate material particles from escaping the first container. The web may be fed through the first container where the alternate material is removed. Accordingly, when the web exits the first container the alternate material may be removed from the surface of the foil.

Although one brush and one vacuum are described, any number of brushes and/or vacuums may be used to remove the alternate material. For example, a first vacuum may collect the particles of alternate material removed by a first brush, and a second vacuum may collect the particles of alternate material removed by a second brush. In another example, a first brush and a second brush may be used to remove alternate material from a first portion of the foil, and a third brush and a fourth brush may be used to remove alternate material from a second portion of the foil. In such an example, a first vacuum may collect the particles of alternate material removed by the first and second brush, and a second vacuum may collect the particles of alternate material removed by the third and fourth brush. In another example, a first brush may be used to remove alternate material from a first portion of the foil, and a second brush may be used to remove alternate material from a second portion of the foil. In another example, a first brush and a second brush may be used to remove alternate material from a first surface of the foil, and a third brush and a fourth brush may be used to remove alternate material from a second surface of the foil.

FIG. 24 is an illustrative flowchart of a process 2400 for removing alternate material from a foil, in accordance with some implementations of the disclosure.

At 2402, a first portion of a foil is coated with an active material having a first thickness. In some implementations, the first portion of the foil is coated with the active material using the same or similar methodologies described at step 2102 above.

At 2404, a second portion of the foil is coated with an alternate material having a second thickness. In some implementations, the second portion of the foil is coated with the alternate material using the same or similar methodologies described at step 2104 above.

At 2406, the foil coated with the active material and the alternate material is dried. In some implementations, the foil coated with the active material and the alternate material is dried using the same or similar methodologies described at step 2208 above.

At 2408, a web is generated by calendering the foil comprising the active material on the first portion of the foil and the alternate material on the second portion of the foil. In some implementations, the web generated using the same or similar methodologies described at step 2106 above.

At 2410, the alternate material is removed from the second portion of the foil using a first brush and a first vacuum. In some implementations, the first brush removes the alternate material from the second portion of the foil by scraping or brushing the alternate material from the surface of the second portion of the foil. In some implementations, the first vacuum collects the alternate material removed by the first brush. In some implementations, a first member is used to support the web during brushing. The first member may allow the first brush to impose a sufficient brushing force while minimizing stretching or damage to the foil of the web. In some implementations, the first brush, the first vacuum, and/or the first member are housed within a first container. In some implementations, the first container prevents alternate material particles from escaping the first container. The web may be fed through the first container where the alternate material is removed. Accordingly, when the web exits the first container the alternate material may be removed from the surface of the foil.

Although one brush and one vacuum are described, any number of brushes and/or vacuums may be used to remove the alternate material. For example, a first vacuum may collect the particles of alternate material removed by a first brush, and a second vacuum may collect the particles of alternate material removed by a second brush. In another example, a first brush and a second brush may be used to remove alternate material from a first portion of the foil, and a third brush and a fourth brush may be used to remove alternate material from a second portion of the foil. In such an example, a first vacuum may collect the particles of alternate material removed by the first and second brush, and a second vacuum may collect the particles of alternate material removed by the third and fourth brush. In another example, a first brush may be used to remove alternate material from a first portion of the foil, and a second brush may be used to remove alternate material from a second portion of the foil. In another example, a first brush and a second brush may be used to remove alternate material from a first surface of the foil, and a third brush and a fourth brush may be used to remove alternate material from a second surface of the foil.

At 2412, the web is slit into one or more electrodes. In some implementations, the web is slit into one or more electrodes using the same or similar methodologies described at step 2212 above.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   coating a first portion of a foil with an active material;
   coating a second portion of the foil with an alternate material;
   generating a web by calendering the foil comprising the active material on the first portion of the foil and the alternate material on the second portion of the foil; and
   removing the alternate material from the second portion of the foil, the alternate material being removed using (a) a first brush, (b) etching, or any combination of (a) and (b).

2. The method of claim 1, wherein the alternate material reduces wrinkling in the second portion of the foil.

3. The method of claim 2, wherein the alternate material reduces wrinkling in the second portion of the foil based, at least in part, on a thickness of the alternate material.

4. The method of claim 1, wherein the alternate material is removed using the first brush.

5. The method of claim 4, further comprising collecting the alternate material removed, using vacuum.

6. The method of claim 4, wherein the alternate material is removed using the first brush and a second brush.

7. The method of claim 1, wherein removing the alternate material further comprises removing at least a portion of the alternate material using laser ablation.

8. The method of claim 1, wherein the alternate material is removed using the etching.

9. The method of claim 1, further comprising drying the foil comprising the active material on the first portion of the foil and the alternate material on the second portion of the foil.

10. The method of claim 1, further comprising slitting the web into one or more electrodes.

11. A method comprising:
coating a first portion of a foil with an active material having a first thickness;
coating a second portion of the foil with an alternate material having a second thickness;
drying the foil comprising the active material on the first portion of the foil and the alternate material on the second portion of the foil;
generating a web by calendering the foil comprising the active material on the first portion of the foil and the alternate material on the second portion of the foil, the alternate material reducing wrinkling in the second portion of the foil based, at least in part, on the second thickness of the alternate material;
removing the alternate material from the second portion of the foil using a first brush and a first vacuum; and
slitting the web into one or more electrodes.

12. The method of claim 11, further comprising removing a portion of the alternate material using laser ablation.

13. The method of claim 11, further comprising coating a third portion of the foil with a second alternate material having the second thickness.

14. The method of claim 13, further comprising removing the second alternate material from the third portion of the foil using a second brush and a second vacuum.

15. The method of claim 11, wherein the active material and the alternate material are coated on a first surface of the foil.

16. The method of claim 15, further comprising coating the second portion of a second surface of the foil with a second alternate material having the second thickness.

17. The method of claim 16, further comprising removing the second alternate material from the second portion of the second surface of the foil using a second brush and a second vacuum.

18. The method of claim 16, further comprising coating a third portion of the first surface of the foil with a third alternate material having the second thickness.

19. The method of claim 18, further comprising removing the third alternate material from the third portion of the foil using a third brush.

20. The method of claim 18, wherein the active material coated on the first portion of the foil is between (i) the alternate material coated on the second portion of the foil and (ii) the third alternate material coated on the third portion of the foil.

* * * * *